United States Patent
Terada et al.

(10) Patent No.: US 9,586,511 B2
(45) Date of Patent: Mar. 7, 2017

(54) DUMPING WORK DETERMINATION SYSTEM FOR HAULAGE VEHICLE

(71) Applicant: Hitachi Construction Machinery Co., Ltd., Tokyo (JP)

(72) Inventors: Shinya Terada, Kasumigaura (JP); Shinjiro Saito, Kasumigaura (JP); Wataru Tanaka, Kyoutanabe (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 15/002,469

(22) Filed: Jan. 21, 2016

(65) Prior Publication Data
US 2016/0264032 A1 Sep. 15, 2016

(30) Foreign Application Priority Data
Mar. 12, 2015 (JP) ................................. 2015-049794

(51) Int. Cl.
*G06F 19/00* (2011.01)
*B60P 1/28* (2006.01)
*B60P 1/04* (2006.01)
*B60P 1/58* (2006.01)
*G07C 5/08* (2006.01)

(52) U.S. Cl.
CPC ................. *B60P 1/283* (2013.01); *B60P 1/04* (2013.01); *B60P 1/045* (2013.01); *B60P 1/58* (2013.01); *G07C 5/0808* (2013.01)

(58) Field of Classification Search
CPC ........... B60P 1/283; G06F 7/00; G07C 5/0808
See application file for complete search history.

(56) References Cited

U.S. PATENT DOCUMENTS

| | | | | |
|---|---|---|---|---|
| 6,484,078 B1* | 11/2002 | Kageyama | ........... | G05D 1/0297 340/989 |
| 8,700,274 B1* | 4/2014 | Tejeda | .................... | B60P 1/283 242/558 |
| 8,903,612 B2* | 12/2014 | Tejeda | .................... | B60P 1/283 177/45 |
| 9,243,923 B2* | 1/2016 | Sugihara | ................ | G06Q 50/02 |
| 2013/0073151 A1* | 3/2013 | Wada | ................... | E02F 3/434 701/50 |

(Continued)

FOREIGN PATENT DOCUMENTS

JP    2013-028306 A    2/2013

*Primary Examiner* — Thomas Tarcza
*Assistant Examiner* — Alex C Dunn
(74) *Attorney, Agent, or Firm* — Mattingly & Malur, PC

(57) ABSTRACT

Disclosed is a dumping work determination system for a haulage vehicle provided with a body frame, a vessel and a drive mechanism for selective raising or lowering of the vessel. The system is applicable to the vehicle to determine a state of loading in the vessel in dumping work, and includes a body frame speed detector, a tilted state detector, a shake detector, and a payload-stuck state determination unit. Based on signals from the detectors, the unit determines whether or not the state of loading is a payload-stuck state. Specifically, the unit determines the payload-stuck state when the speed of the body frame is detected to have reached lower than a predetermined speed, the vessel is detected to have tilted to a predetermined position, and a state where the vessel can be considered to have no longer produced shakes is detected by the shake detector.

11 Claims, 32 Drawing Sheets

(56) References Cited

U.S. PATENT DOCUMENTS

2013/0120579 A1* 5/2013 Mlitsuta ............... H04N 7/18
　　　　　　　　　　　　　　　　　　　　　348/148
2016/0264133 A1* 9/2016 Ohsugi ............... B60R 21/00
2016/0264134 A1* 9/2016 Ohsugi ............... B60R 21/00

* cited by examiner

DUMPING WORK DETERMINATION SYSTEM FOR HAULAGE VEHICLE

CROSS-REFERENCE TO RELATED APPLICATION

This application claims the priority of Japanese Patent Application 2015-49794 filed Mar. 12, 2015, which is incorporated herein by reference.

BACKGROUND OF THE INVENTION

1. Field of the Invention

This invention relates to a dumping work determination system for a haulage vehicle. The dumping work determination system performs a determination as to the state of loading in a vessel in dumping work from the haulage vehicle.

2. Description of the Related Art

In general, a large haulage vehicle such as a dump truck is provided with a vessel raisably disposed on a body frame. The haulage vehicle travels with a payload (for example, crushed stone or earth) loaded in a large quantity in the vessel, whereby the haulage of the payload is performed. As one of the conventional art on such haulage vehicles, there is known a haulage vehicle provided with hoist cylinders, a hydraulic power source, a control valve unit, and a control device (see, for example, JP-A-2013-28306). The hoist cylinders are telescopically disposed between a vessel and a body frame such that, when dumping a payload from the vessel, the hoist cylinders extend to obliquely tilt the vessel. The hydraulic power source produces pressure oil to be supplied to the hoist cylinders. The control valve unit is disposed between the hydraulic power source and the hoist cylinders to control the supply and drainage of pressure oil to and from the hoist cylinders. The control device performs switching control of the control valve unit.

After traveling, with a payload loaded in the vessel, to a dumping site at a delivery destination, the haulage vehicle of this conventional technology extends the hoist cylinders to lift up the vessel obliquely rearward so that the payload is dumped to the dumping site along the direction of an inclination of the vessel. If the payload in the vessel is a high-stickiness payload, for example, like clayish earth, some of the payload may stick an inner side of the vessel and may not slide down even when the vessel is tilted toward the rear of the body frame.

To prevent the payload from remaining in the vessel as mentioned above, the haulage vehicle of the conventional technology is configured to control the switching of the control valve unit such that upon performing the dump work of the payload, in other words, dumping work, the hoist cylinders are allowed to shake up and down in its extension/contraction direction.

SUMMARY OF THE INVENTION

It is to be noted that, if the dumped payload deposits into a heap of earth at a location rearward of rear wheels as in the case that the payload is dumped from the vessel onto a flat ground surface in the above-mentioned dumping work from the haulage vehicle, the dump of residuals of the payload in the vessel is inhibited by the heap of earth, leading to a state that the residuals of the payload are stuck in the vessel. In such a state, the heap of earth cannot be removed even when the haulage vehicle of the conventional technology as disclosed in JP-A-2013-28306 performs the control of the above-mentioned switching of the control valve unit. It is, therefore, difficult to efficiently perform the dumping work of the payload no matter whether or not the payload is sticky.

Even if the payload is stuck in the vessel, on the other hand, the payload that remains in the vessel can be dumped by moving the body frame forward with the vessel lifted obliquely rearward and tilted. In the above-mentioned haulage vehicle of the conventional technology, however, no consideration is made about a device that monitors the state of loading in the vessel. It is, therefore, necessary for an operator to move the body frame by surmising whether or not the payload is stuck in the vessel. Unless the operator becomes aware of the payload stuck in the vessel, it takes time until the payload is all dumped from the vessel. There is, accordingly, a concern about a possible reduction in the efficiency of dumping work.

With such a situation of the conventional technology in view, the present invention has been made. An object of the present invention is, therefore, to provide a dumping work determination system for a haulage vehicle, which makes it possible to efficiently dump a payload from a vessel even if the payload comes into a state that it is stuck in the vessel.

To achieve the above-described object, the present invention provides, in one aspect thereof, a dumping work determination system for a haulage vehicle provided with a body frame, a vessel disposed above the body frame to load therein an object to be hauled, and a drive mechanism disposed on the body frame to permit selectively raising or lowering the vessel relative to the body frame such that upon dumping the object from the vessel, the vessel is liftedup and raised. The dumping work determination system is applicable to the haulage vehicle to determine a state of loading in the vessel in dumping work from the haulage vehicle. The dumping work determination system includes a body frame speed detector that detects a speed of the body frame, a tilted state detector that detects a tilted state of the vessel relative to the body frame, a shake detector that detects shakes of the vessel, which occur upon dumping the object from the vessel, a payload-stuck state determination unit that based on signals from the body frame speed detector, tilted state detector and shake detector, determines whether or not the state of loading in the vessel in the dumping work is a payload-stuck state indicative of a state that the object is stuck in the vessel, and an output unit that outputs a result of the determination by the payload-stuck state determination unit. The payload-stuck state determination unit determines the state of loading in the vessel to be the payload-stuck state when the speed of the body frame is detected by the body frame speed detector to have reached lower than a predetermined speed, the vessel is detected by the tilted state detector to have tilted to a predetermined position, and a state where the vessel can be considered to have no longer produced shakes is detected by the shake detector.

According to the dumping work determination system of the present invention for the haulage vehicle, the payload can be efficiently dumped from the vessel even if the payload comes into a state that it is stuck in the vessel. It is to be noted that problems, configurations and advantageous effects other than those mentioned above will become apparent from the following description of embodiments.

DETAILED DESCRIPTION OF PREFERRED EMBODIMENTS

Embodiments for carrying out the dumping work determination system according to the present invention for the haulage vehicle will hereinafter be described based on the accompanying drawings.

First Embodiment

Figure 1:
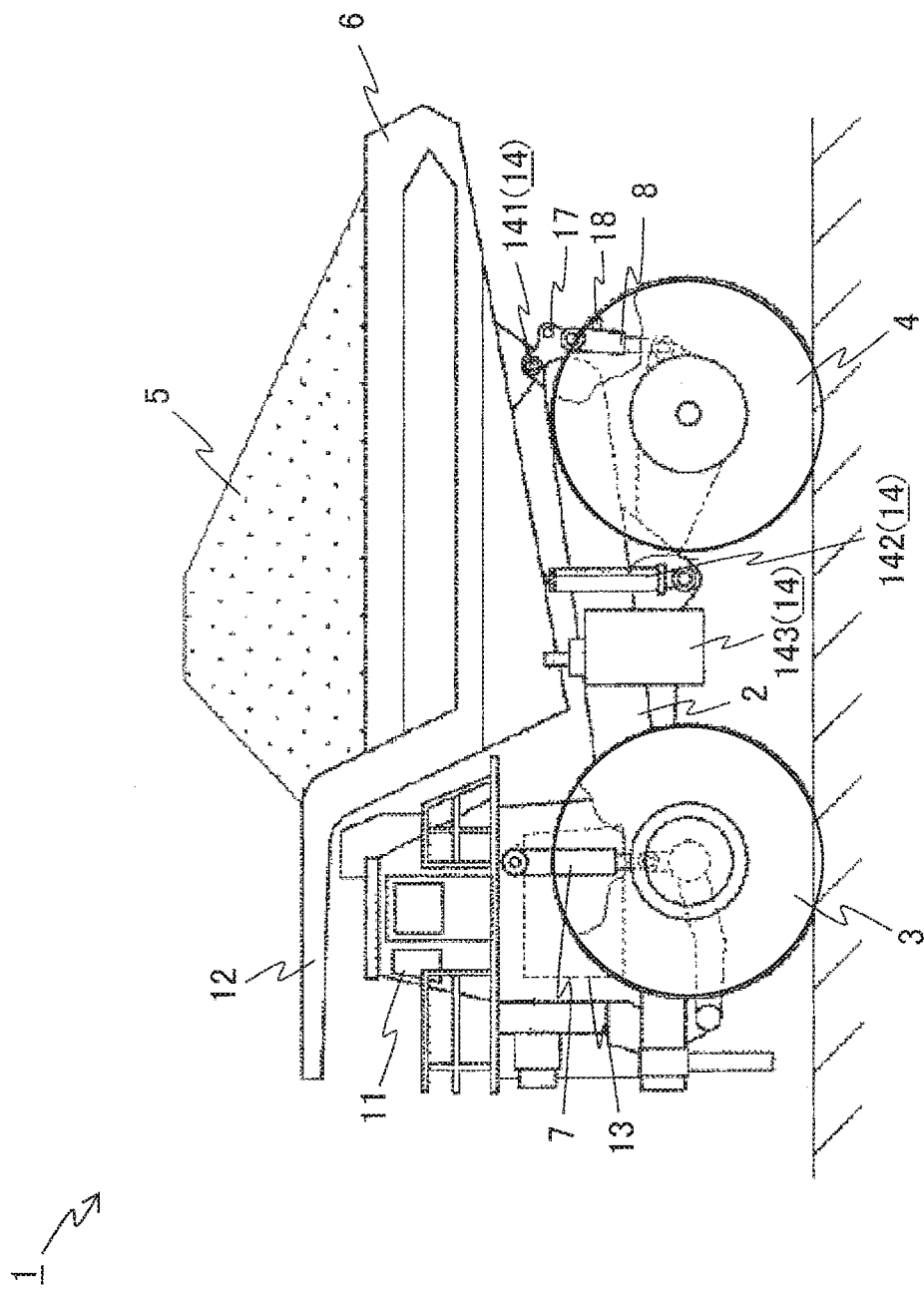
FIG. 1 is a side view showing the configuration of a dump truck mentioned as an example of a haulage vehicle to which a first embodiment of a dumping work determination system according to the present invention can be applied.

The first embodiment of the dumping work determination system according to the present invention is applied, for example, as shown in FIG. 1 to a dump truck 1 that as a haulage vehicle, hauls an object to be hauled such as crushed stone or earth excavated in amine. As the dump truck 1 to which the first embodiment of the present invention is applied, a manned vehicle on which an operator rides to operate the same is shown. First, a description will be made in detail about the configuration of this dump truck 1 with reference to FIGS. 1 and 2.

Figure 2:
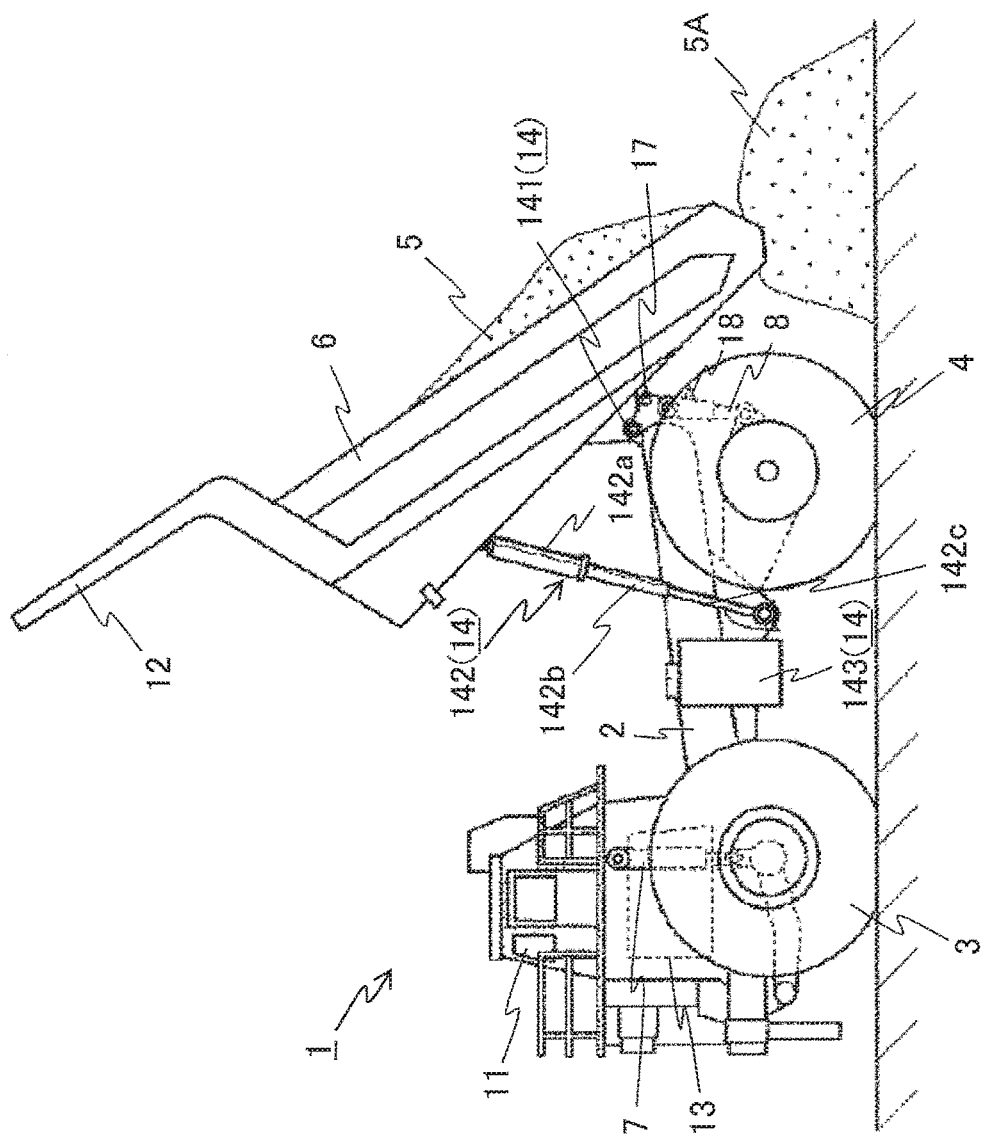
FIG. 2 is a diagram illustrating how dumping work from the dump truck shown in FIG. 1 is performed, specifically a diagram in a situation that a dumping site is provided on a flat ground surface.

As shown in FIGS. 1 and 2, the dump truck 1 is provided with a body frame 2, a pair of front wheels 3 rotatably disposed on opposite right and left ends, respectively, of a front section of the body frame 2, a pair of rear wheels 4 rotatably disposed on opposite right and left ends, respectively, of a rear section of the body frame 2, a vessel 6 disposed above the body frame 2 and adapted to load therein a payload 5 as an object to be hauled (which will be described as earth in this embodiment), front suspension cylinders 7 interposed between the body frame 2 and the front wheels 3 to support the vessel 6 via the body frame 2, and rear suspension cylinders 8 interposed between the body frame 2 and the rear wheels 4 to support the vessel 6 via the body frame 2.

The front wheels 3 function as steered wheels to be steered by an operator of the dump truck 1, and like the rear wheels 4, have a diameter set as a tire diameter (outer diameter dimension), for example, as large as 2 to 4 meters. The rear wheels 4 function as driving wheels for the dump truck 1, and are rotationally driven by a travel drive unit (not shown) that allows the dump truck 1 to travel. As a consequence, the front wheels 3 rotate following the rotation of the rear wheels 4 so that the dump truck 1 is allowed to travel.

The vessel 6 is formed as a large vessel, the overall length of which is as long as 10 to 13 meters, for example, to load earth 5 in a large quantity. Further, the vessel 6 can change its posture relative to the body frame 2 by a below-described drive mechanism 14 between a hauling position upon haulage of the earth 5 (see FIG. 1) and a dumping position upon dumping the earth 5 from the vessel 6 (see FIG. 2). As illustrated in FIG. 2, when the vessel 6 is in the dumping position, the loaded earth 5 is dumped onto a predetermined dumping site at a delivery destination such that it slides down along a lower surface inside the tilted vessel 6.

The front suspension cylinders 7 support the front wheels 3 movably in up-and-down direction relative to the front section of the body frame 2, and act as hydraulic absorbers that buffer loads and impacts, which act on the front section of the body frame, by internal hydraulic pressure. The rear suspension cylinders 8 support the rear wheels 4 movably in up-and-down direction relative to the rear section of the body frame 2, and act as hydraulic absorbers that buffer loads and impacts, which act on the rear section of the body frame, by internal hydraulic pressure.

The dump truck 1 is also provided with a cab 11 mounted on the front section of the body frame 2 for allowing the operator to ride therein, a canopy 12 disposed extending from a front edge of the vessel 6 to a location above the cab 11 and covering the cab 11 from its upper side, an engine 13 disposed as a power source for the below-described drive mechanism 14 and a controller 19 (see FIG. 4) underneath the cab 11, and the drive mechanism 14 disposed to permit raising the vessel 6 relative to the body frame 2 and adapted to lift up and raise the vessel 6 upon dumping the earth 5 from the vessel 6.

The cab 11 forms an operator's compartment, where the operator performs control such as allowing the dump truck 1 to travel and raising the vessel 6 to dump the earth 5. Although not shown in the drawings, the cab 11 is internally provided with an operator's seat in which the operator sits, a steering wheel to be manipulated upon switching the advancing direction of the body frame right and left, an accelerator pedal to be operated upon accelerating the body frame, a brake pedal to be operated upon braking the body frame, a hoist control lever to be manipulated upon raising or lowering the vessel 6, an engine switch to be manipulated upon starting or stopping the engine 13, and the like.

As the canopy 12 covers the cab 11 almost completely from the above, it has a function to protect the cab 11, for example, from flying stones including rocks and the like. The canopy 12 also has a function to protect the operator inside the cab 11 if the dump truck 1 ever overturns. The engine 13 is comprised, for example, of a large diesel engine, and rotationally drives a below-described hydraulic pump (not shown) included in the drive mechanism 14.

The drive mechanism 14 is configured, for example, of a connecting pin 141, a pair of hoist cylinders 142, and hydraulic equipment to be described subsequently herein. The connecting pin 141 pivotally connects the rear section of the body frame 2 and a lower part of a rear section of the vessel 6 with each other, and functions as a pivot fulcrum for the vessel 6 relative to the body frame 2. The paired hoist cylinders 142 are disposed on the body frame 2 at locations forward of the connecting pin 141, and connects the body frame 2 and the vessel 6 together. The hydraulic equipment includes some devices accommodated in a power unit (not shown) disposed on the front section of the body frame 2, and serves to drive the hoist cylinders 142 by pressure oil.

The hoist cylinders 142 are telescopically arranged, for example, on right and left sides, respectively, between the body frame 2 and the vessel 6, and as illustrated in FIG. 2, are comprised of multistage (two-stage, in this embodiment) hydraulic cylinders. Each hoist cylinders 142 is comprised of an outer cylinder portion 142a located on an outer side, an inner cylinder portion 142b telescopically arranged in the outer cylinder portion 142a, and a piston rod 142c telescopically disposed in the inner cylinder portion 142b.

The above-mentioned hydraulic equipment has, for example, a hydraulic oil tank 143, the hydraulic pump (not shown), and a directional control valve (not shown). The hydraulic oil tank 143 is centrally provided on the body frame 2, and stores hydraulic oil. The hydraulic pump delivers the hydraulic oil as pressure oil from the hydraulic oil tank 143 to the hoist cylinders 142. The directional control valve controls a flow (the direction and flow rate) of hydraulic oil, which is to be supplied from the hydraulic pump to the hoist cylinders 142, according to the manipulation of the hoist control lever in the cab 11.

With the drive mechanism 14 of such a configuration as described above, the manipulation of the hoist control lever in the cab 11 to an "up" position, where the vessel 6 is to be lifted up, supplies the hydraulic oil from the hydraulic pump to the bottom-side pressure chambers in the hydraulic cylinders 142 via the directional control valve, and at the same time, returns the hydraulic oil from the rod-side pressure chambers to the hydraulic oil tank 143. At this time, the piston rods 142c are downwardly pushed from the inner cylinder portions 142b and the inner cylinder portions 142b are downwardly pulled out of the outer cylinder portions 142a, whereby the hoist cylinders 142 extend. As illustrated in FIG. 2, the hoist cylinders 142, therefore, lift up the vessel 6 and allow the vessel 6 to pivot (tilt) obliquely rearward about the connecting pin 141 as the pivot fulcrum, so that the vessel 6 is raised relative to the body frame 2.

When the hoist control lever is manipulated to a "down" position where the vessel 6 is to be lifted down or to a "float" position where the vessel 6 is to be lifted down by using the own weight of the vessel 6, on the other hand, the hydraulic oil is supplied or replenished from the hydraulic pump to the rod-side pressure chambers in the hoist cylinders 142 via the directional control valve, and the hydraulic oil is returned from the bottom-side pressure chambers to the hydraulic oil tank 143 via the directional control valve. At this time, the piston rods 142c are pushed back into the inner cylinder portions 142b and the inner cylinder portions 142b are pushed back into the outer cylinder portions 142a, whereby the hoist cylinders 142 contract. As shown in FIG. 1, the hoist cylinders 142, therefore, allow the vessel 6 to downwardly pivot about the connecting pin 141 as the pivot fulcrum while supporting the vessel 6, whereby the vessel 6 is lowered relative to the body frame 2.

When the hoist control lever is manipulated to a neutral position as an initial position, the communication between the hydraulic pump and hydraulic oil tank 143 and the hoist cylinders 142 are cut off by the directional control valve so that the movements of the piston rods 142c of the hoist cylinders 142 stop. Accordingly, the vessel 6 is allowed to remain at an inclination θ (see FIG. 6) relative to the body frame 2.

Now, the dumping site for the dump truck 1 is assumed to be provided at a flat ground surface, for example, as illustrated in FIG. 2. When the vessel 6 is lifted up and tilted by the hoist cylinders 142, the earth 5 slides down from the vessel 6 and deposits at a location rearward of the rear wheels 4, so that a heap of earth 5A is formed. At this time, the dump of the earth 5 which still remains in the vessel 6 is inhibited by the heap of earth 5A, resulting in a state that the earth 5 is stuck in the vessel 6.

Figure 3:
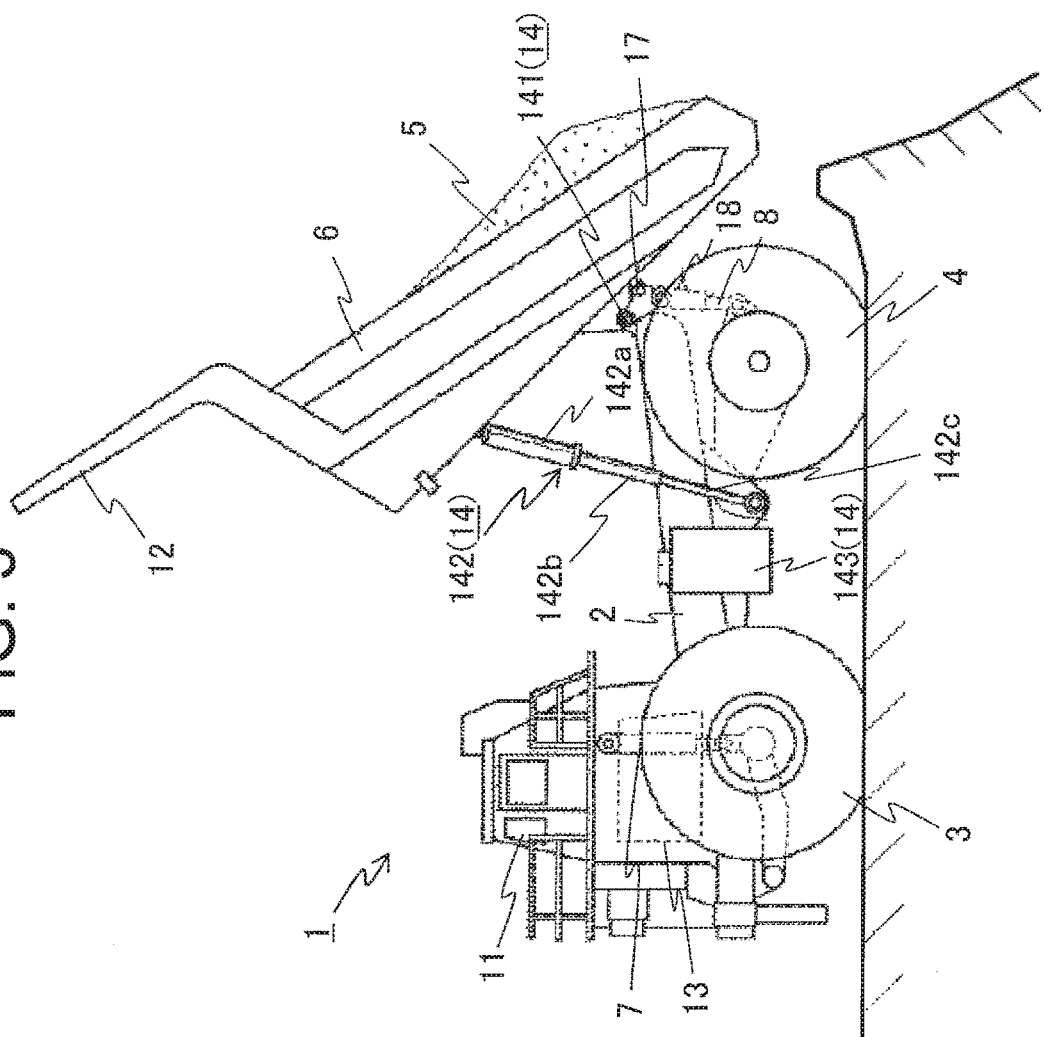
FIG. 3 is a diagram illustrating how dumping work from the dump truck shown in FIG. 1 is performed, specifically a diagram in a situation that a dumping site is provided under a cliff.

As illustrated in FIG. 3, for example, the dumping site for the dump truck 1 is next assumed to be provided under a cliff. If the dump truck 1 is in the situation of stopping with the body frame located significantly close to the side of the cliff, the earth 5 can be smoothly dumped off of the cliff from the vessel 6 without being stuck in the vessel 6 even when the vessel 6 is simply lifted up and tilted by the hoist cylinders 142. If the vessel 6 is simply lifted up and tilted by the hoist cylinders 142 when the dump truck 1 is in a situation of stopping nearer than the location of the cliff in view of the safety and the like of the dumping work, on the other hand, some of the earth 5 cannot be dumped off the cliff from the vessel 6 and, similar to the case that the earth 5 is dumped onto the flat ground surface, is brought into a state of being stuck in the vessel 6. Unless the operator in the cab 11 is well aware of such a state of loading in the vessel 6, it is impossible to proceed with the dumping work so that the efficiency of the dumping work is lowered.

Figure 4:
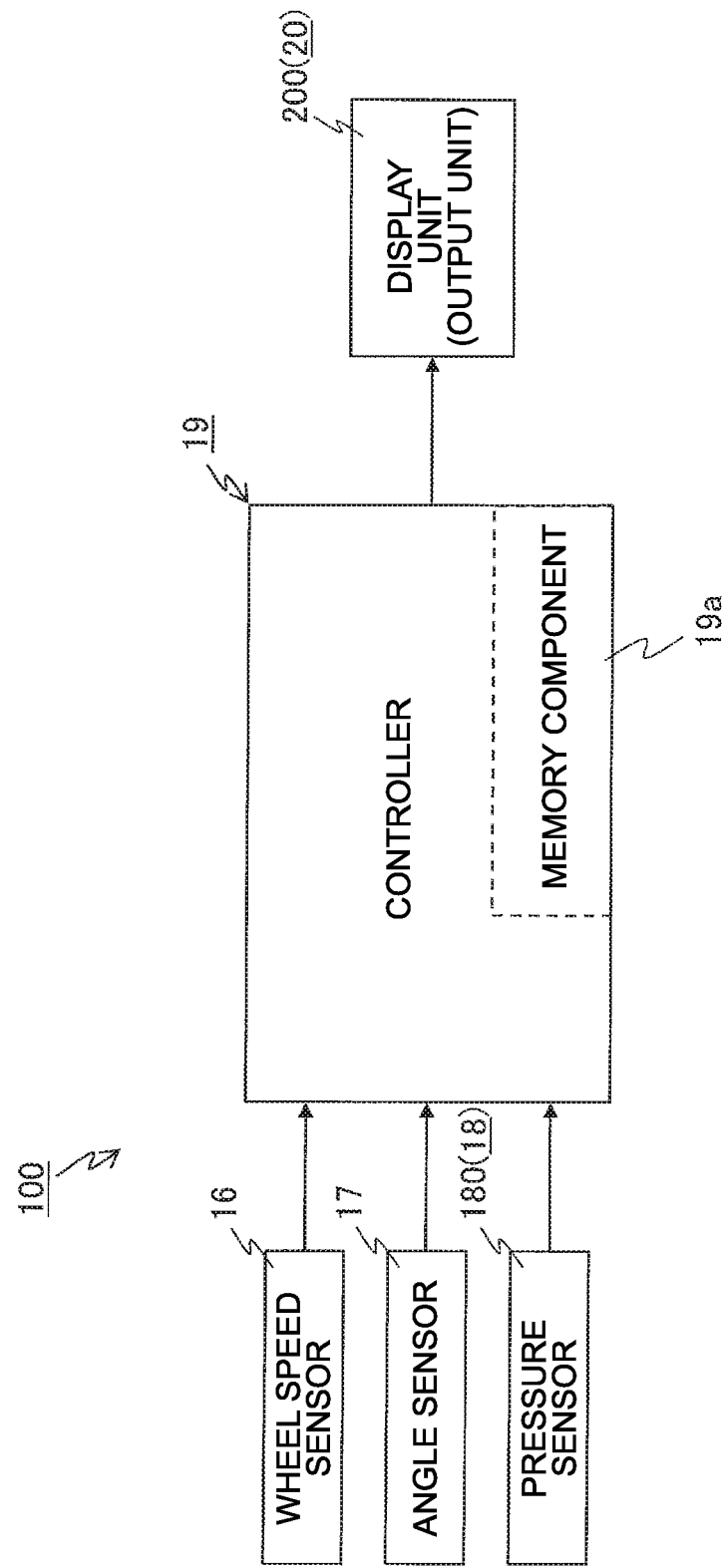
FIG. 4 is a diagram depicting the configuration of a dumping work determination system according to a first embodiment of the present invention.
Figure 5:
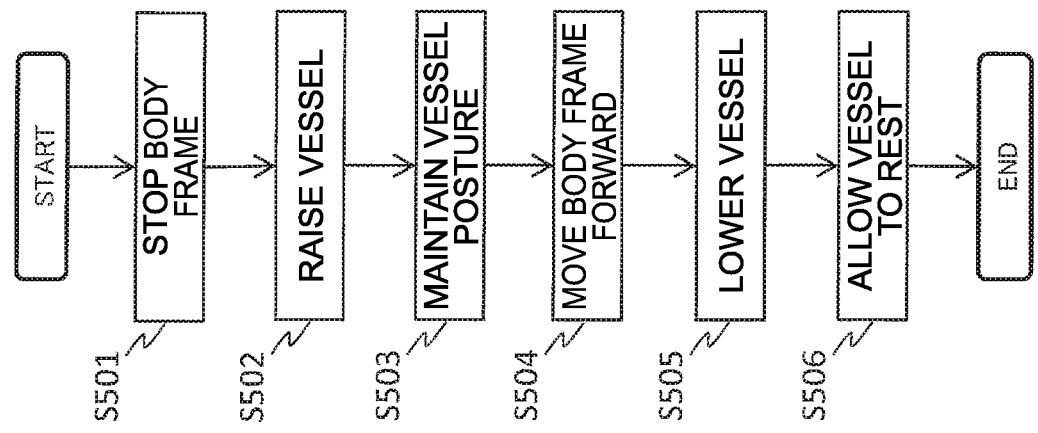
FIG. 5 is a flowchart illustrating a flow of steps in dumping work from the dump truck shown in FIG. 1.

On the dump truck 1, the dumping work determination system according to the first embodiment of the present invention is, therefore, mounted as depicted at numeral 100 in FIG. 4 to determine the state of loading in the vessel 6 in dumping work. About the configuration of this dumping work determination system 100, a description will hereinafter be made in detail primarily with reference to FIGS. 4 through 9.

The dumping work determination system 100 according to the first embodiment of the present invention is provided, for example, with a body frame speed detector 16 that detects the speed of the body frame, a tilted state detector 17 that detects the state of tilting of the vessel 6 relative to the body frame 2, and a shake detector 18 that detects shakes of the vessel 6 which occur upon dumping the earth 5 from the vessel 6.

The dumping work determination system 100 is also provided with a controller 19 and a below-described output unit 20. The controller 19 is connected at an input side thereof to the body frame speed detector 16, tilted state detector 17 and shake detector 18, and performs processing to determine the state of loading in the vessel 6 in dumping work from the dump truck 1. The output unit 20 is connected to an output side of the controller 19, and outputs the result of a determination about the state of loading in the vessel 6 as processed by the controller 19.

The body frame speed detector 16 is provided, for example, in the vicinity of one of the front wheels 3, and is comprised of a wheel speed sensor. This wheel speed sensor detects the rotational speed of the front wheel 3, i.e., the wheel speed V (see FIG. 6), and will hereinafter be designated by the same reference numeral as the body frame speed detector. A detection signal of the wheel speed sensor 16 is outputted to the controller 19. The wheel speed sensor 16 detects the rotational speed of one of the driven wheels of the dump truck 1, and therefore can be considered as one that detects the speed of the body frame.

The tilted state detector 17 is provided, for example, on the rear section of the body frame 2 in the vicinity of the connecting pin 141, and is comprised of an angle sensor. This angle sensor detects the inclination θ (see FIG. 6) of the vessel 6 relative to the body frame 2, and will hereinafter be designated by the same reference numeral as the tilted state detector. A detection signal of the angle sensor 17 is outputted to the controller 19.

The shake detector 18 is provided, for example, on one of the rear suspension cylinders 8 between the body frame 2 and the rear wheels 4, and is comprised of a pressure sensor 180 as a pressure detector. The pressure sensor 180 detects the pressure P (see FIG. 8) in the associated rear suspension cylinder 8. For the sake of convenience, this pressure will hereinafter be called "suspension pressure". A detection signal of the pressure sensor 180 is outputted to the controller 19.

The controller 19 is comprised of a microcomputer or the like, and functions as a control unit that controls the entire operations of the dump truck 1. Although not depicted in the drawings, the controller 19 is configured including hardware and software. The hardware includes, for example, CPU (Central Processing Unit) that performs various operations for determining the state of loading in the vessel 6 in dumping work, and a memory component 19a such as ROM (Read Only Memory) and HDD (Hard Disk Drive), which store programs for performing operations by CPU, and RAM (Random Access Memory) that serves as a work area when CPU executes the programs. The software is stored in the memory unit 19a, and is executed by the controller 19. Through their cooperation, the function as the control unit can be realized. It is to be noted that a dumping work determination processing program is included in the software to process the determination as to the state of loading in the vessel 6 in dumping work.

Now, with a view to facilitating the understanding of the specific internal configuration indicative of the function of the controller 19, a description will first be made in detail about the procedure of the dumping work from the dump truck 1 with reference to FIGS. 1 to 3 and 5.

First, in a mine such as a quarry, the earth 5 as an object to be hauled is loaded on the vessel 6, for example, by using a large hydraulic excavator (not shown). At this time, the vessel 6 takes, as shown in FIG. 1, the posture of a hauling position that the vessel 6 is lowered relative to the body frame 2. The dump truck 1 then hauls the earth 5 toward a predetermined dumping site with the earth 5 loaded in a large quantity on the vessel 6.

When the dump truck 1 arrives at the dumping site, the operator in the cab 11 manipulates or operates, for example, the steering wheel, accelerator pedal and brake pedal to stop the body frame at a predetermined dumping location [step (hereinafter abbreviated as "S") 501]. The operator then switches the hoist control lever to the "up" position to allow the hoist cylinders 142 to extend, whereby the vessel 6 is lifted up and tilted (S502). When the vessel 6 is tilted near to a maximum inclination to which it can pivot, the operator switches the hoist control lever to the neutral position and maintains the posture of the vessel 6 for a predetermined period of time (S503).

Next, the operator again manipulates or operates the steering wheel, accelerator pedal and brake pedal to allow the body frame to move forward at a low speed while maintaining the vessel 6 in the same posture as in S503 (S504). When the operator switches the hoist control lever to the "down" position or "float" position to lower the vessel 6 toward the body frame 2 while maintaining the body frame at the location moved forward (S505), the vessel 6 rests on the body frame 2 and returns to the posture at the hauling position (S506), whereby dumping work from the dump truck 1 is ended.

About the state of the body frame in such dumping work from the dump truck 1, a description will next be made in detail with reference to FIG. 6, which specifically shows the situation that the dumping site for the dump truck 1 is provided on a flat ground surface. It is to be noted that in FIG. 6, the speed Va is a stop determination speed for determining that the body frame is at a standstill when the wheel speed V is lower than the value of the speed Va, the angle θa is a resting determination angle for determining that the vessel 6 rests on the body frame 2 when the inclination θ of the vessel 6 is smaller than the value of the angle θa, and the angle θb is a dumping determination angle for determining that the earth 5 is being dumped from the vessel 6 when the inclination θ of the vessel 6 is equal to or greater than the value of the angle θb. These speed Va, angle θa and angle θb have been set beforehand and are stored in the memory component 19a.

Figure 6:
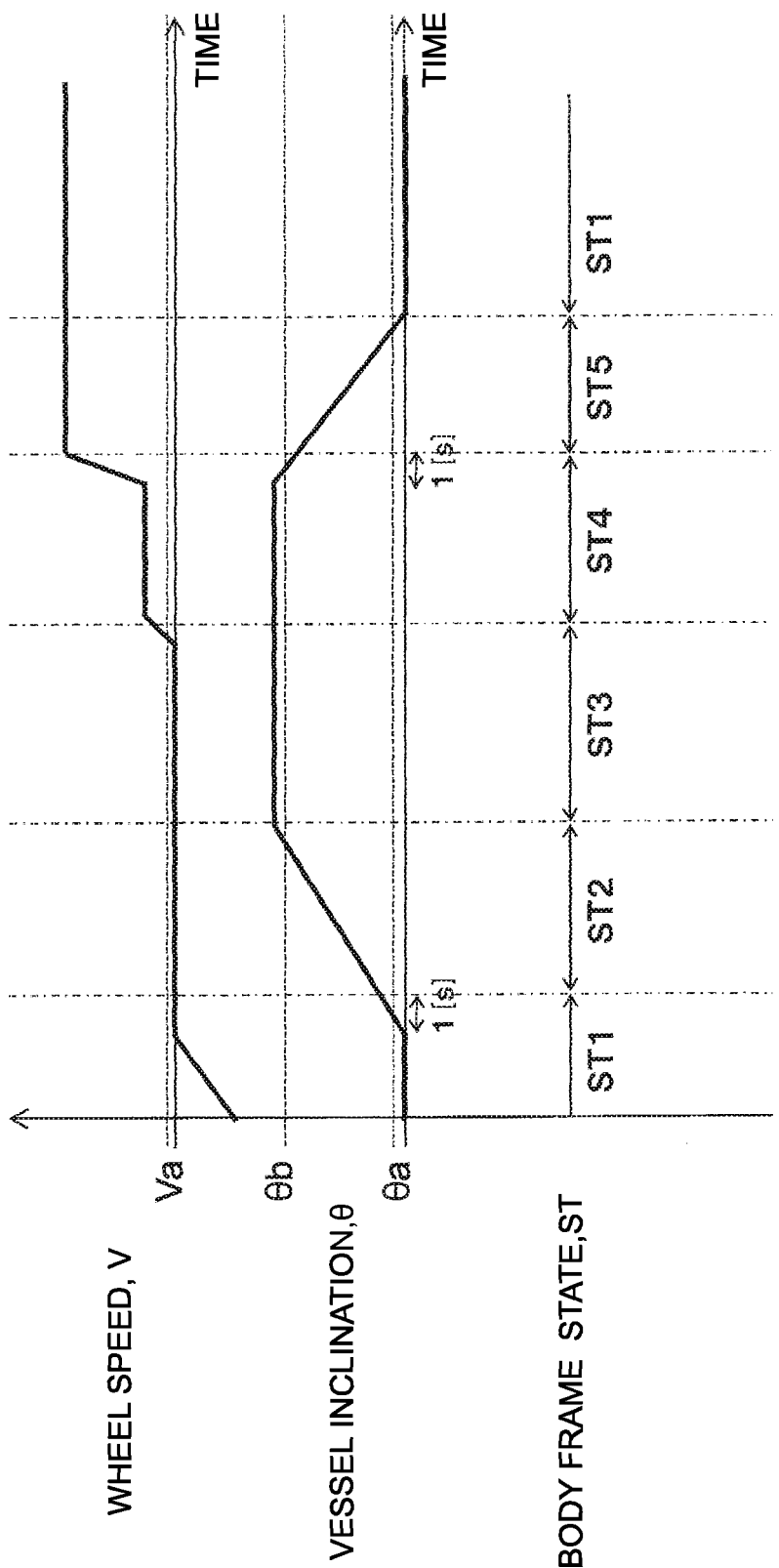
FIG. 6 is a graph showing correlations among wheel speed V, vessel inclination θ and body frame state ST in the dumping work from the dump truck shown in FIG. 1.

As indicated in FIG. 6, until the dump truck 1 arrives at the dumping site, the inclination θ of the vessel 6 is smaller than the resting determination angle θa, and therefore the body frame state ST is a vessel-resting state ST1 indicative of a state that the vessel 6 rests (has been lowered) on the body frame 2. When the dump truck 1 arrives at the dumping site and stops at a dumping location, the inclination θ of the vessel 6 begins to increase shortly after the stop. Upon lapse of a predetermined time (for example, 1 second) after the beginning of the increase of the inclination θ, the body frame state ST changes to a vessel-raising state ST2 indicative of a state that the vessel 6 is being lifted up.

When the inclination θ of the vessel 6 increases to the dumping determination angle θb or greater, the dump truck 1 is at a standstill. Therefore, the body frame state ST changes to a raised-vessel maintaining state indicative of a state that the vessel 6 remains lifted up and raised, in other words, a dumping state ST3 indicative of a state that the earth 5 is being dumped from the vessel 6. After a while since this dumping state ST3, the wheel speed V increases to the stop determination speed Va or higher and the body frame is moving forward with the inclination θ of the vessel 6 maintained at the dumping determination angle θb or greater. Therefore, the body frame state ST changes to a vessel-raised forward moving state indicative of a state that the dump truck 1 has been allowed to move forward with the vessel 6 maintained lifted up.

Subsequently, the inclination θ of the vessel 6 has decreased, the dumping of the earth 5 has been completed, and the vessel 6 has been lowered. Therefore, the body frame state ST changes to a vessel-lowering state ST5 indicative of a state that the vessel 6 is being lowered. When the inclination θ of the vessel 6 then decreases to smaller than the resting determination angle θa, the body frame state ST again changes back to the vessel-resting state ST1.

Figure 7:
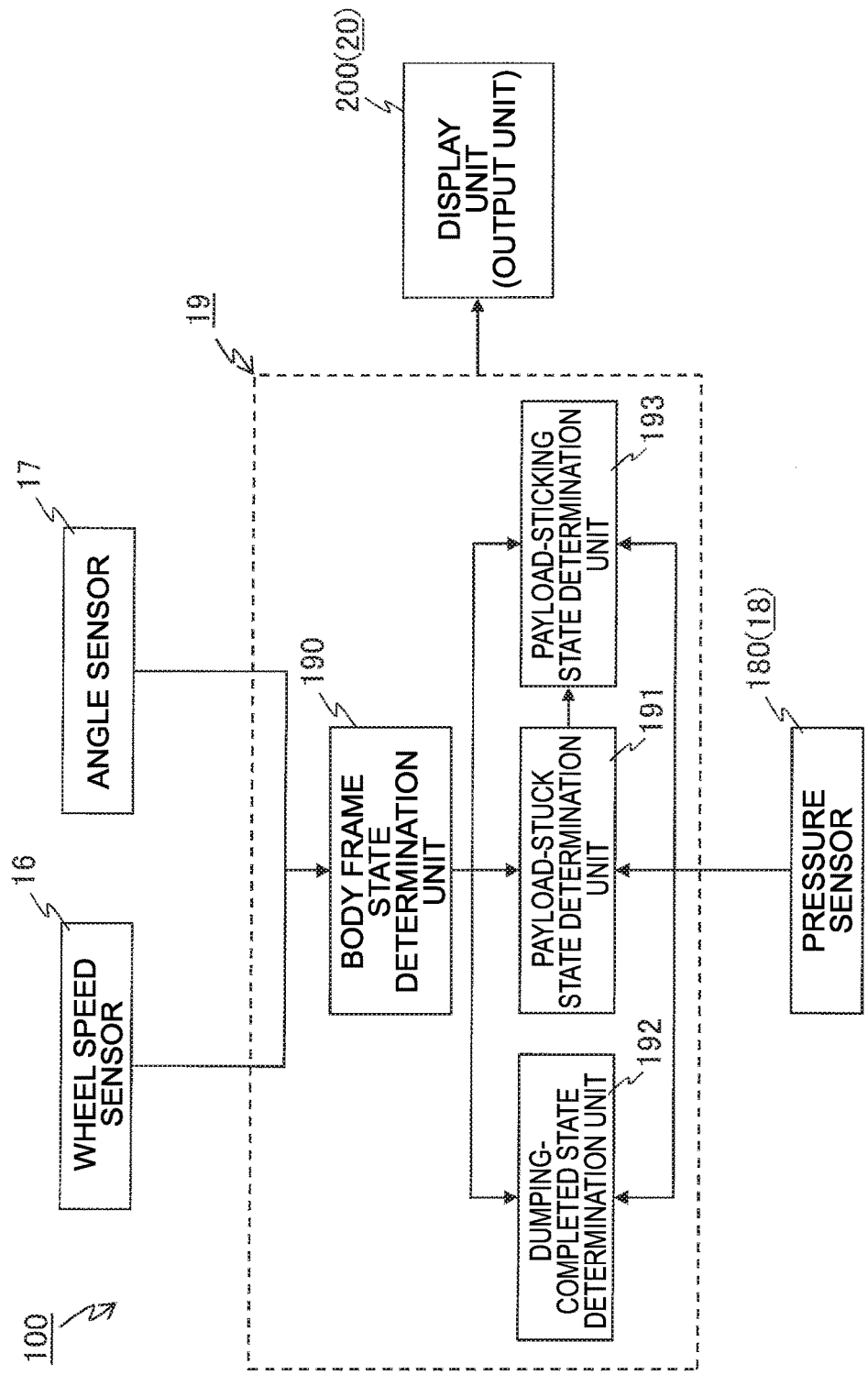
FIG. 7 is a functional block diagram illustrating the internal configuration of a controller depicted in FIG. 4.

With reference to FIG. 7, a description will next be made in detail about the specific internal configuration that indicates the function of the controller 19 in the first embodiment of the present invention.

As illustrated in FIG. 7, the controller 19 includes a body frame state determination unit 190 that based on signals from the wheel speed sensor 16 and angle sensor 17, determines in which one of the vessel-resting state ST1, vessel-raising state ST2, dumping state (raised-vessel maintaining state) ST3, vessel-raised forward moving state ST4 and vessel-lowering state ST5 the body frame state ST in the dumping work is.

The controller 19 also includes a payload-stuck state determination unit 191, a dumping-completed state determination unit 192, and a payload-sticking state determination unit 193. The payload-stuck state determination unit 191 determines, based on signals from the wheel speed sensor 16, angle sensor 17 and pressure sensor 180, whether or not the state of loading in the vessel 6 in the dumping work is a payload-stuck state indicative of a state that the earth 5 is stuck in the vessel 6. The dumping-completed state determination unit 192 determines, based on signals from the wheel speed sensor 16, angle sensor 17 and pressure sensor 180, whether or not the state of loading in the vessel 6 in the dumping work is a dumping-completed state indicative of a state that the dumping of the earth 5 has been completed. The payload-sticking state determination unit 193 determines, based on signals from the body frame state determination unit 190, payload-stuck state determination unit 191 and pressure sensor 180, whether or not the state of loading in the vessel 6 in the dumping work is a payload-sticking state indicative of a state that the earth 5 is sticking on the vessel 6.

The body frame state determination unit 190 calculates a time-dependent difference Δθ of the inclination θ of the vessel 6 from a detection value of the angle sensor 17. The body frame state determination unit 190 determines the body frame state ST to be the vessel-resting state ST1 when the inclination θ of the vessel 6 as detected by the angle sensor 17 is smaller than the resting determination angle θa (θ<θa), or determines the body frame state ST to be the vessel-raising state ST2 when the inclination θ of the vessel 6 as detected by the angle sensor 17 is equal to or greater than the resting determination angle θa (θ≥θa) and the calculated time-dependent difference Δθ of the inclination θ of the vessel 6 is greater than the value of 0 (Δθ>0) during a predetermined time Ta (for example, 1 second).

Further, the body frame state determination unit 190 determines the body frame state ST to be the dumping state ST3 when the wheel speed V as detected by the wheel speed sensor 16 is lower than the stop determination speed Va (V<Va) and the inclination θ of the vessel 6 as detected by the angle sensor 17 is equal to or greater than the dumping determination angle θb (θ≥θb), or determines the body frame state ST to be the vessel-raised forward moving state ST4 when the wheel speed V as detected by the wheel speed sensor 16 is equal to or higher than the stop determination speed Va (V≥Va) and the inclination θ of the vessel 6 as detected by the angle sensor 17 is equal to or greater than the dumping determination angle θb (θ≥θb).

Furthermore, the body frame state determination unit 190 determines the body frame state ST to be the vessel-lowering state ST5 when the inclination θ of the vessel 6 as detected by the angle sensor 17 is smaller than the dumping determination angle θb (θ<θb) and the calculated time-dependent difference Δθ of the inclination θ of the vessel 6 is smaller than, the value of 0 (Δθ<0) during a predetermined time Tb (for example, 1 second).

The payload-stuck state determination unit 191 determines the state of loading in the vessel 6 to be a payload-stuck state when the wheel speed V is detected by the wheel speed sensor 16 to have decreased to lower than a predetermined speed, the vessel 6 is detected by the angle sensor 17 to have tilted to a predetermined position, and further, a state G1 where the vessel 6 can be considered to have no longer produced shakes (see FIG. 8) is detected by the pressure sensor 180.

Figure 8:
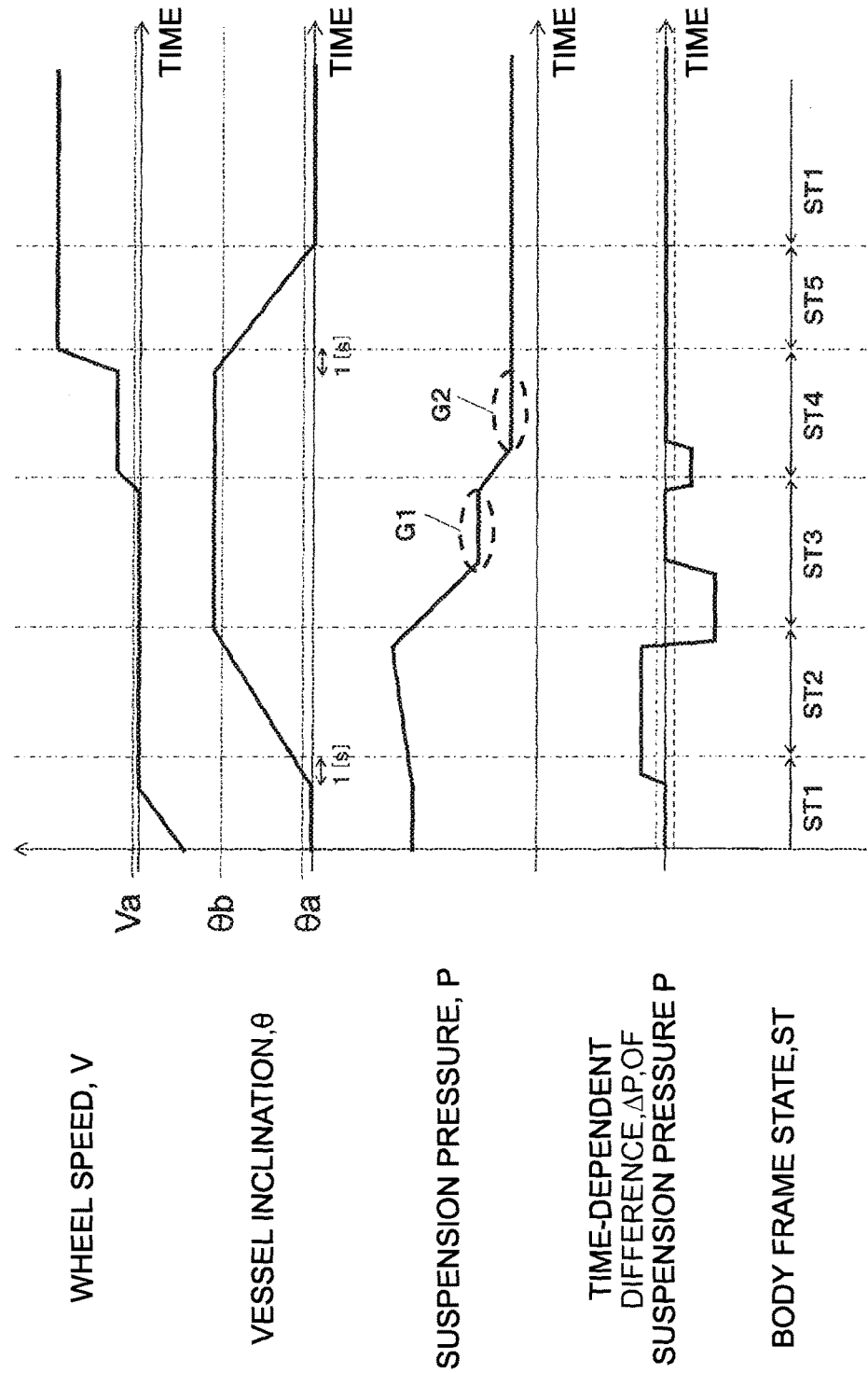
FIG. 8 is a graph showing time series variations of wheel speed V, vessel inclination θ, suspension pressure P, time-dependent difference ΔP of suspension pressure P, and body frame state ST when earth the stickiness of which is not high is dumped from a vessel.

Now, when the body frame state ST is the dumping state ST3 as shown in FIG. 8, there is a period of time where the suspension pressure P remains constant, whereby the earth 5 is ascertained to be stuck in the vessel 6. In such a period of time where the suspension pressure P remains constant, the body frame state ST changes to the state G1 where the vessel 6 can be considered by the pressure sensor 180 to have no longer produced shakes, and the time-dependent difference ΔP of the suspension pressure P takes the value of substantially 0.

Therefore, the payload-stuck state determination unit 191 calculates the time-dependent difference ΔP of the suspension pressure P, for example, from a detection value of the pressure sensor 180, and determines the state of loading in the vessel 6 to be a payload-stuck state when the wheel speed V as detected by the wheel speed sensor 16 is lower than the stop determination speed Va (V<Va), the inclination θ of the vessel 6 as detected by the angle sensor 17 is equal to or greater than the dumping determination angle θb (θ≥θb), and the time-dependent difference ΔP of the suspension pressure P remains within a predetermined range (for example, a small range set around the value of 0) during a predetermined period T1 (for example, 1 second).

As the detection signals to be outputted from the wheel speed detection sensor 16 and angle sensor 17 to the payload-stuck state determination unit 191 are routed through the body frame state determination unit 190 in the first embodiment of the present invention, the payload-stuck state determination unit 191 is configured to determine the state of loading in the vessel 6 to be a payload-stuck state when the body frame state ST is determined to be the dumping state ST3 by the body frame state determination unit 190 and the time-dependent difference ΔP of the suspension pressure P as obtained from a detection value of the pressure sensor 180 remains within the predetermined range during the predetermined time T1.

The dumping-completed state determination unit 192 determines the state of loading in the vessel 6 to be a dumping-completed state when the wheel speed V is detected by the wheel speed sensor 16 to have increased to a predetermined speed or higher, the vessel 6 is determined by the angle sensor 17 to have tilted to a predetermined position, and further, a state G2 where the vessel 6 can be considered to have no longer produced shakes (see FIG. 8) is detected by the pressure sensor 180.

Now, when the body frame state ST is the vessel-raised forward moving state ST4 as shown in FIG. 8, there is a period of time where the suspension pressure P remains constant, whereby the dumping of the earth 5 from the vessel 6 is ascertained to have been completed. In such a period of time where the suspension pressure P remains constant, the body frame state ST changes to the state G2 where the vessel 6 can be considered by the pressure sensor 180 to have no longer produced shakes, and the time-dependent difference ΔP of the suspension pressure P takes the value of substantially 0.

Therefore, the dumping-completed state determination unit 192 calculates the time-dependent difference ΔP of the suspension pressure P, for example, from a detection value of the pressure sensor 180, and determines the state of loading in the vessel 6 to be a dumping-completed state when the wheel speed Vas detected by the wheel speed sensor 16 is equal to or higher than the stop determination speed Va (V≥Va), the inclination θ of the vessel 6 as detected by the angle sensor 17 is equal to or greater than the dumping determination angle θb (θ≥θb), and the time-dependent difference θP of the suspension pressure P remains within a predetermined range (for example, a small range set around the value of 0) during a predetermined period T2 (for example, 1 second).

As the detection signals to be outputted from the wheel speed detection sensor 16 and angle sensor 17 to the dumping-completed state determination unit 192 are routed through the body frame state determination unit 190 in the first embodiment of the present invention, the dumping-completed state determination unit 192 is configured to determine the state of loading in the vessel 6 to be a dumping-completed state when the body frame state ST is determined to be the vessel-raised forward moving state ST4 by the body frame state determination unit 190 and the time-dependent difference θP of the suspension pressure P as obtained from a detection value of the pressure sensor 180 remains within the predetermined range during the predetermined time T2.

Figure 9:
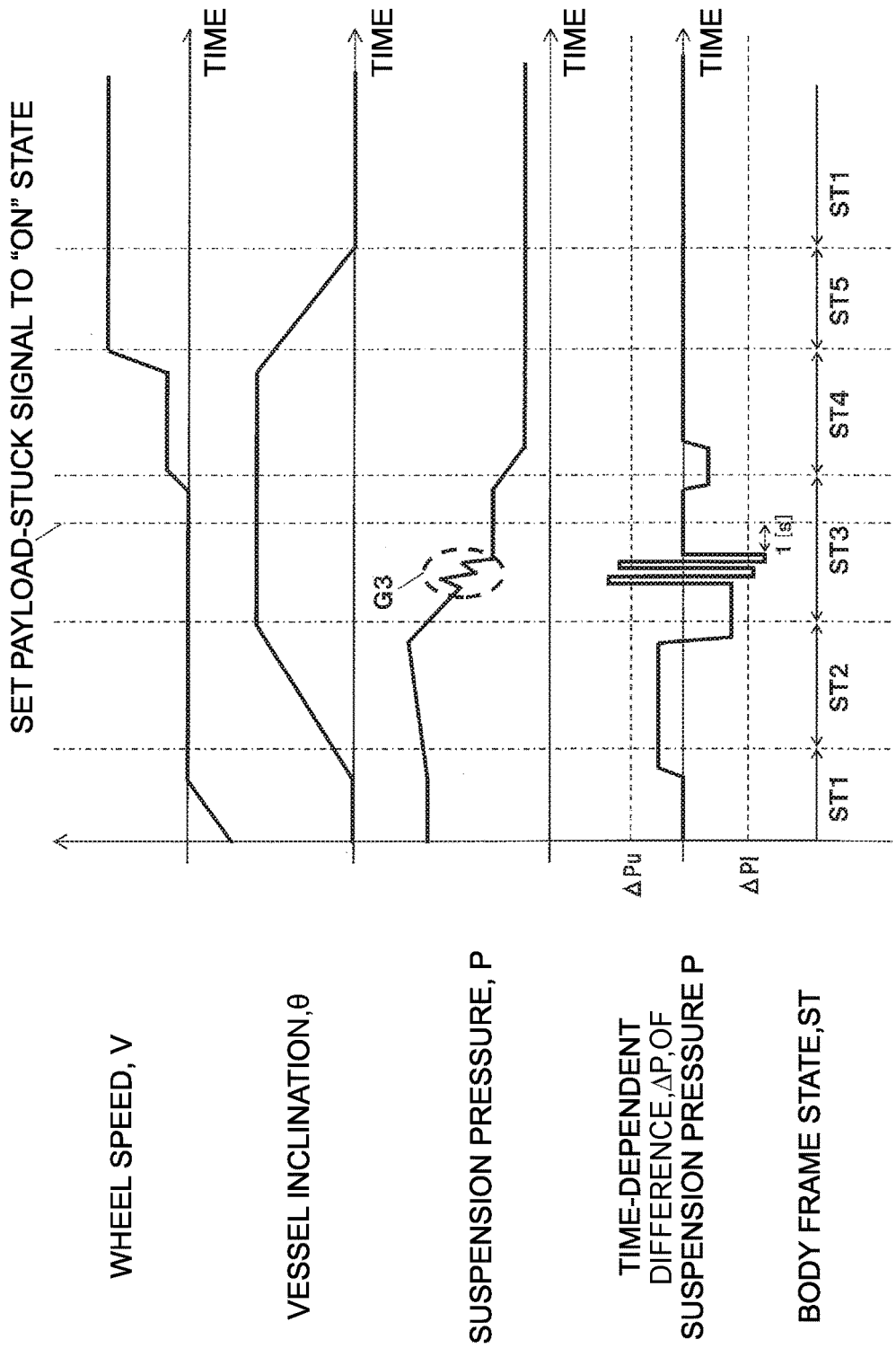
FIG. 9 is a graph showing time series variations of wheel speed V, vessel inclination θ, suspension pressure P, time-dependent difference ΔP of suspension pressure P, and body frame state ST when earth the stickiness of which is high is dumped from the vessel.

When the earth 5 in the vessel 6 contains clay or the like and has high stickiness, on the other hand, the great deal of earth is dumped in a mass to the outside in the dumping state ST3 while rapidly sliding down from the vessel 6. At this time, large shakes are produced on the body frame to result in a state G3 that the suspension pressure P varies at short intervals as shown in FIG. 9. The time-dependent difference ΔP of the suspension pressure P, therefore, considerably fluctuates while taking a maximum value and a minimum value so that the sticking of the earth 5 on the vessel 6 is ascertained. Such fluctuations of the time-dependent difference ΔP of the suspension pressure P take place before the state of loading in the vessel 6 becomes a payload-stuck state after the body frame state ST has changed to the dumping state ST3.

The payload-sticking state determination unit 193, therefore, determines the state of loading in the vessel 6 to be a payload-sticking state, for example, when the time-dependent difference ΔP of the suspension pressure P is calculated from detection values of the pressure sensor 180, the body frame state ST is determined to be the dumping state ST3 by the body frame state determination unit 190, the state of loading in the vessel 6 is determined not to be a payload-stuck state by the payload-stuck state determination unit 191, and the time-dependent difference ΔP of the suspension pressure P has varied exceeding a preset positive threshold level ΔPu or negative threshold level ΔP1. It is to be noted that the threshold levels ΔPu, ΔP1 empirically indicate the upper and lower limits of maximum and minimum values which may arise, for example, when the high-stickiness earth 5 sticks the vessel 6.

The above-mentioned output unit 20 is provided on the dump truck 1, and is configured of a display unit 200 as a notification unit that notifies the state of loading in the vessel 6 according to the results of determinations by the payload-stuck state determination unit 191, dumping-completed state determination unit 192 and payload-sticking state determination unit 193. For example, this display unit 200 is mounted in the cab 11, and is comprised of a liquid crystal display or the like capable of displaying by characters, a design or the like that the state of loading in the vessel 6 is one of a payload-stuck state, a dumping-completed state and a payload-sticking state. It is to be noted that the notification unit is not limited to the above-mentioned display unit 200 but may be configured, for example, of a voice output unit or speech synthesizer, such as a buzzer, that outputs a voice or speech corresponding to the state of loading in the vessel 6, a lamp or the like that performs lighting in a preset lighting pattern or lighting color according to the state of loading in the vessel 6, or the like.

About the determination processing for the state of loading in the vessel 6 by the dumping work determination system 100 according to the first embodiment of the present invention, a description will next be made in detail with reference to FIG. 10.

First, the controller 19 in the dumping work determination system 100 initializes the variables of the time-dependent difference ΔP of the suspension pressure P and the body frame state ST, which are to be used for the determination of the state of loading in the vessel 6, and those of respective signals (payload-stuck signal, dumping-completed signal and payload-sticking signal) generated to output the results of a determination of the state of loading in the vessel 6. Described specifically, the time-dependent difference ΔP of the suspension pressure P is set to 0, the body frame state ST is set to the vessel-resting state ST1, the payload-stuck signal is set to OFF state, the dumping-completed signal is set to OFF state, and the payload-sticking signal is set to OFF state (S1001).

When the controller 19 reads detection signals from the wheel speed sensor 16, angle sensor 17 and pressure sensor 180 (S1002), the body frame state determination unit 190 performs determination processing for the body frame state ST in the dumping work according to the wheel speed V detected by the wheel speed sensor 16 and the inclination θ of the vessel 6 as detected by the angle sensor 17 (S1003), and outputs the result of the determination to the payload-stuck state determination unit 191, dumping-completed state determination unit 192 and payload-sticking state determination unit 193, respectively.

The payload-stuck state determination unit 191 then performs, according to the result of the determination from the body frame state determination unit 190 and the time-dependent difference ΔP of the suspension pressure P, determination processing as to whether or not the state of loading in the vessel 6 in the dumping work is a payload-stuck state, and outputs the result of the determination to the payload-sticking state determination unit 193 and display unit 200 (S1004).

Subsequently, the dumping-completed state determination unit 192 performs, according to the result of the determination from the body frame state determination unit 190 and the time-dependent difference ΔP of the suspension pressure P, determination processing as to whether or not the state of loading in the vessel 6 in the dumping work is a dumping-completed state, and outputs the result of the determination to the display unit 200 (S1005).

The payload-sticking state determination unit 193 then performs, according to the result of the determination from the body frame state determination unit 190, the result of the determination from the payload-stuck state determination unit 191 and the time-dependent difference ΔP of the suspension pressure P, determination processing as to whether or not the state of loading in the vessel 6 in the dumping work is a payload-sticking state, and outputs the result of the determination to the display unit 200 (S1006).

The display unit 200 next performs processing to make a notification to the operator in the cab 11 by displaying, according to the results of the determinations at the payload-stuck state determination unit 191, dumping-completed state determination unit 192 and payload-sticking state determination unit 193, on a screen that the state of loading in the vessel 6 is one of a payload-stuck state, a dumping-completed state and a payload-sticking state (S1007).

The controller 19 then determines whether or not the wheel speed V read in S1002 is an abnormal value VL set beforehand or greater (S1008). If the controller 19 determines that the wheel speed V is the abnormal value VL or greater at this time (S1008/YES), the determination processing for the state of loading in the vessel 6 by the dumping work determination system 100 is ended.

If the wheel speed V is determined to be smaller than the abnormal value VL in S1008 (S1008/NO), the controller 19 determines whether or not the inclination θ of the vessel 6 as read in S1002 is an abnormal value θL set beforehand or greater (S1009). If the inclination θ of the vessel 6 is determined to be the abnormal value θL or greater at this time (S1009/YES), the controller 19 ends the determination processing for the state of loading in the vessel 6 by the dumping work determination system 100.

If the inclination θ of the vessel 6 is determined to be smaller than the abnormal value θL in S1009 (S1009/NO), the controller 19 determines whether or not the suspension pressure P read in S1002 is an abnormal value PL set beforehand or greater (S1010). If the suspension pressure P is determined to be the abnormal value PL or greater at this time (S1010/YES), the controller 19 ends the determination processing for the state of loading in the vessel 6 by the dumping work determination system 100. If the suspension pressure P is determined to be smaller than the abnormal value PL in S1010 (S1010/NO), the controller 19 repeats processing from S1002.

Figure 10:
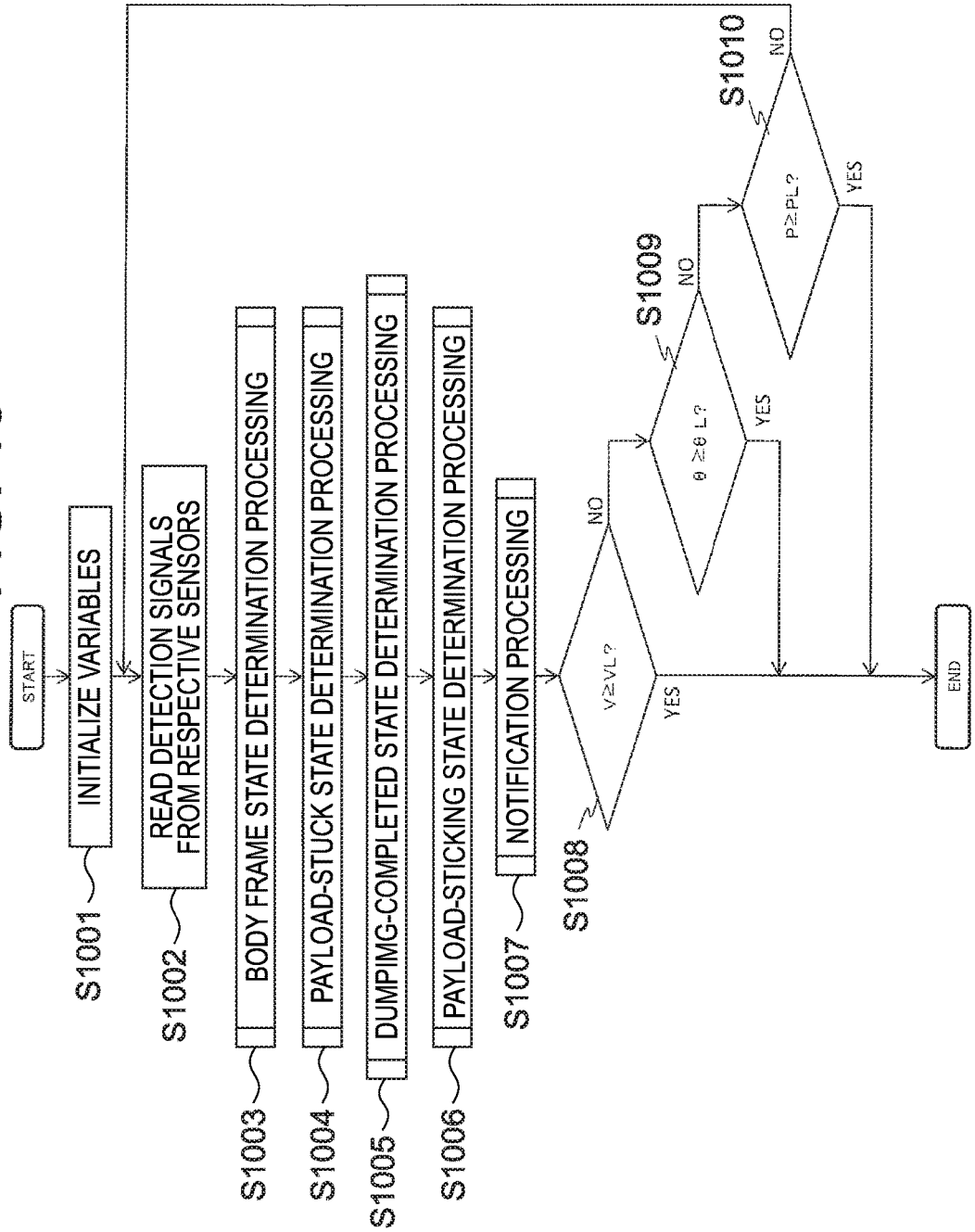
FIG. 10 is a flowchart illustrating a flow of determination processing for the state of loading in the vessel by the dumping work determination system according to the first embodiment of the present invention.

The determination processing for the body frame state ST by the body frame state determination unit 190 in S1003 as illustrated in FIG. 10 will next be described in detail based on the flowchart of FIG. 11.

The body frame state determination unit 190 determines whether or not the body frame state ST determined in the preceding determination processing for the body frame state ST is the vessel-resting state ST1 (S1101). If the body frame state ST is determined to be the vessel-resting state ST1 at this time (S1101/YES), the body frame state determination unit 190 performs determination processing for the vessel-resting state ST1 (S1102) and ends the determination processing for the body frame state ST by the body frame state determination unit 190.

If the body frame state ST is determined not to be the vessel-resting state ST1 in S1101 (S1101/NO), the body frame state determination unit 190 determines whether or not the body frame state ST determined by the preceding determination processing for the body frame state ST is the vessel-raising state ST2 (S1103). If the body frame state ST is determined to be the vessel-raising state ST2 at this time (S1103/YES), the body frame state determination unit 190 performs determination processing for the vessel-raising state ST2 (S1104) and ends the determination processing for the body frame state ST by the body frame state determination unit 190.

If the body frame state ST is determined not to be the vessel-raising state ST2 in S1103 (S1103/NO), the body frame state determination unit 190 determines whether or not the body frame state ST determined in the preceding determination processing for the body frame state ST is the dumping state ST3 (S1105). If the body frame state ST is determined to be the dumping state ST3 at this time (S1105/YES), the body frame state determination unit 190 performs determination processing for the dumping state ST3 (S1106), and the determination processing for the body frame state ST by the body frame state determination unit 190 is ended.

If the body frame state ST is determined not to be the dumping state ST3 in S1105 (S1105/NO), the body frame state determination unit 190 determines whether or not the body frame state ST determined in the preceding determination processing for the body frame state ST is the vessel-raised forward moving state ST4 (S1107). If the body frame state ST is determined to be the vessel-raised forward moving state ST4 at this time (S1107/YES), the body frame state determination unit 190 performs determination processing for the vessel-raised forward moving state ST4 (S1108), and the determination processing for the body frame state ST by the body frame state determination unit 190 is ended.

If the body frame state ST is determined not to be the vessel-raised forward moving state ST4 in S1107 (S1107/NO), the body frame state determination unit 190 determines that the body frame state ST determined in the preceding determination processing for the body frame state ST is the vessel-lowering state ST5, and performs determination processing for the vessel-lowering state ST5 (S1109). The determination processing for the body frame state ST by the body frame state determination unit 190 is ended.

Figure 11:
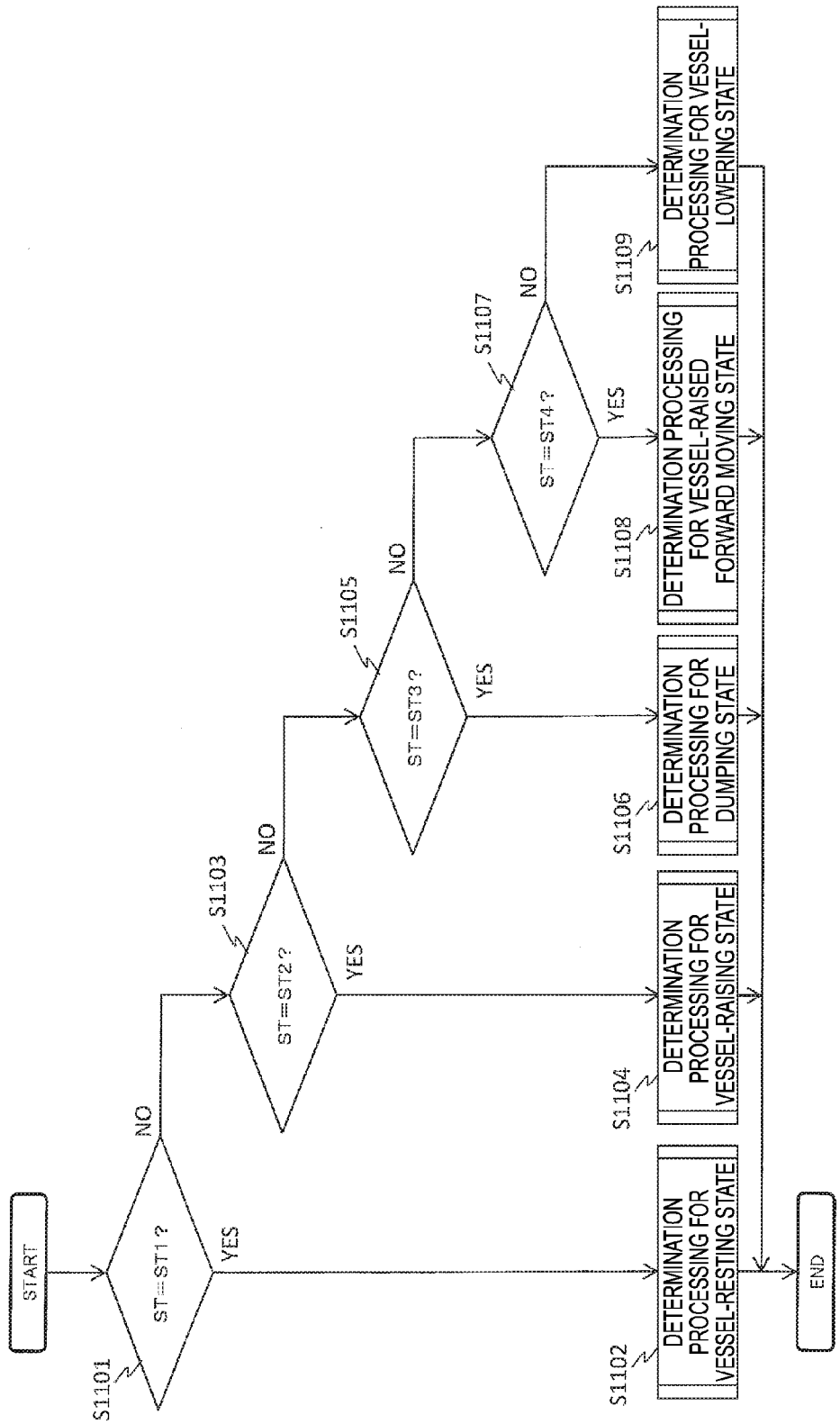
FIG. 11 is a flowchart illustrating a flow of determination processing for a body frame state ST by a body frame state determination unit in S1003 shown in FIG. 10.

The determination processing for the vessel-resting state ST1 in S1102 as illustrated in FIG. 11 will next be described in detail based on the flowchart of FIG. 12.

Figure 12:
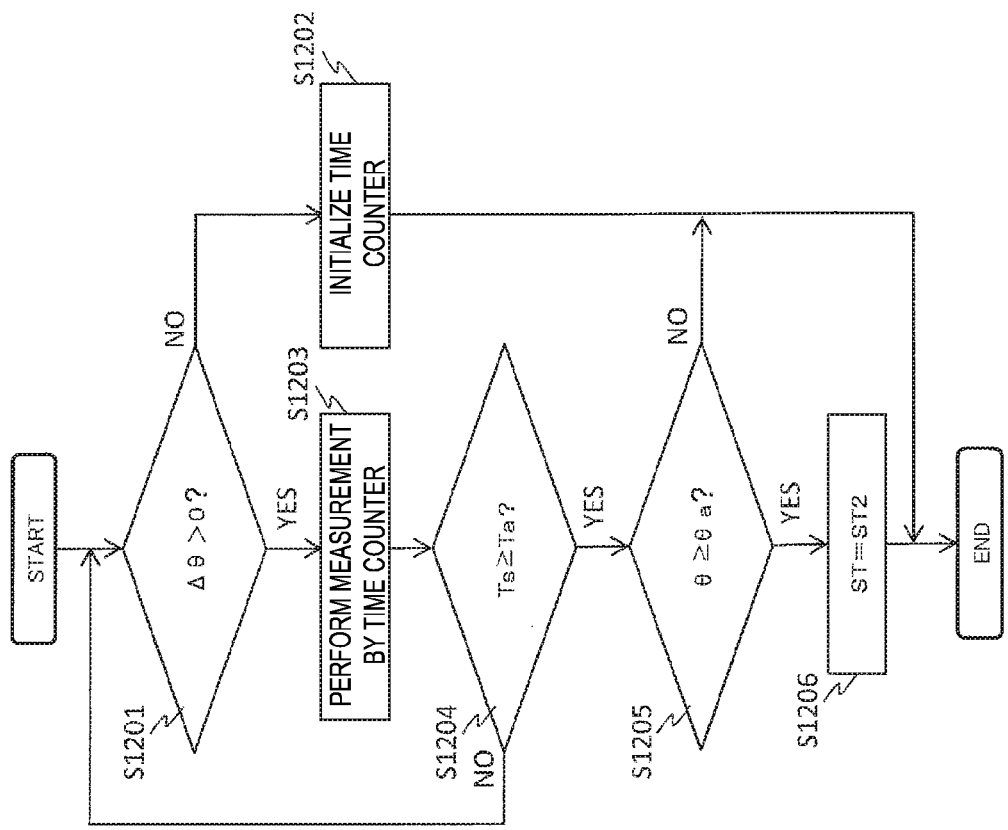
FIG. 12 is a flowchart illustrating a flow of determination processing for a vessel-resting state ST1 in S1102 shown in FIG. 11.

As illustrated in FIG. 12, the body frame state determination unit 190 determines whether or not the time-dependent difference $\Delta\theta$ of the inclination $\theta$ of the vessel 6, which was obtained from the detection value of the angle sensor 17 as read in S1002, is greater than the value 0 (S1201). If the time-dependent difference $\Delta\theta$ of the inclination $\theta$ of the vessel 6 is determined to be equal to or smaller than the value of 0 at this time (S1201/NO), the body frame state determination unit 190 sets the count value of an internal time counter at 0 to initialize (reset) the time counter (S1202), and ends the determination processing for the vessel-resting state ST1.

If the time-dependent difference $\Delta\theta$ of the inclination $\theta$ of the vessel 6 is determined to be greater than the value of 0 in S1201 (S1201/YES), the body frame state determination unit 190 performs, by the internal time counter, the counting of a cumulative time Ts during which this state will continue (S1203), and confirms whether or not the cumulative time Ts has reached a predetermined time Ta (S1204). If the body frame state determination unit 190 confirms at this time that the cumulative time Ts has not reached the predetermined time Ta (S1204/NO), processing is repeated from S1201.

If the cumulative time Ts is confirmed to have reached the predetermined time Ta in S1204 (S1204/YES), the body frame state determination unit 190 determines whether or not the inclination $\theta$ of the vessel 6 is equal to or greater than the resting determination angle $\theta a$ (S1205). If the inclination $\theta$ of the vessel 6 is determined to be smaller than the resting determination angle $\theta a$ at this time (S1205/NO), the body frame state determination unit 190 ends the determination processing for the vessel-resting state ST1.

If the inclination $\theta$ of the vessel 6 is determined to be equal to or greater than the resting determination angle $\theta a$ in S1205 (S1205/YES), this means that the body frame state ST has changed from the vessel-resting state ST1, which was determined in the preceding determination processing for the body frame state ST, to the vessel-raising state ST2. The body frame state determination unit 190, therefore, determines the body frame state ST to be the vessel-raising state ST2 (S1206), and ends the determination processing for the vessel-resting state ST1.

The determination processing for the vessel-raising state ST2 in S1104 as illustrated in FIG. 11 will next be described in detail based on the flowchart of FIG. 13.

Figure 13:
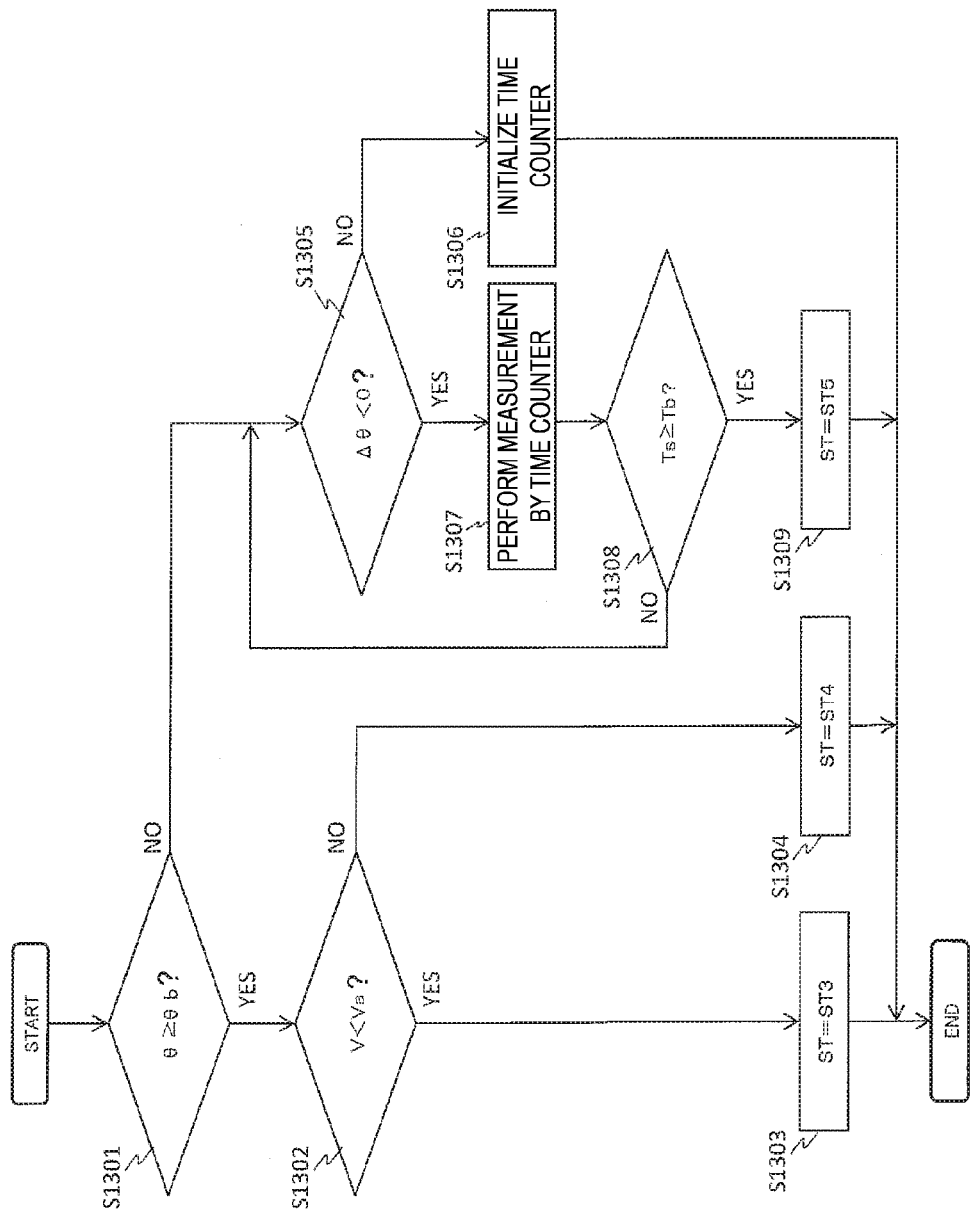
FIG. 13 is a flowchart illustrating a flow of determination processing for a vessel-raising state ST2 in S1104 shown in FIG. 11.

As illustrated in FIG. 13, the body frame state determination unit 190 determines whether or not the inclination $\theta$ of the vessel 6 as read in S1002 is equal to or greater than the dumping determination angle $\theta b$ (S1301). If the inclination $\theta$ of the vessel 6 is determined to be equal to or greater than the dumping determination angle $\theta b$ at this time (S1301/YES), the body frame state determination unit 190 determines whether or not the wheel speed V read in S1002 is lower than the stop determination speed Va (S1302).

If the wheel speed V is determined to be lower than the stop determination speed Va in S1302 (S1302/YES), this means that the body frame state ST has changed from the vessel-raising state ST2, which was determined in the preceding determination processing for the body frame state ST, to the dumping state ST3. The body frame state determination unit 190, therefore, determines the body frame state ST to be the dumping state ST3 (S1303), and ends the determination processing for the vessel-raising state ST2.

If the wheel speed V is determined to be equal to or higher than the stop determination speed Va in S1302 (S1302/NO), this means that the body frame state ST has changed from the vessel-raising state ST2, which was determined in the preceding determination processing for the body frame state ST, to the vessel-raised forward moving state ST4. The body frame state determination unit 190, therefore, determines the body frame state ST to be the vessel-raised forward moving state ST4 (S1304), and ends the determination processing for the vessel-raising state ST2.

If the inclination $\theta$ of the vessel 6 is determined to be smaller than the dumping determination angle $\theta b$ on the other hand in S1301 (S1301/NO), the body frame state determination unit 190 determines whether or not the time-dependent difference $\Delta\theta$ of the inclination $\theta$ of the vessel 6, which was obtained from the detection value of the angle sensor 17 as read in S1002, is smaller than the value of 0 (S1305). If the time-dependent difference $\Delta\theta$ of the inclination $\theta$ of the vessel 6 is determined to be equal to or greater than the value 0 at this time (S1305/NO), the body frame state determination unit 190 sets the count value of the internal time counter at 0 to initialize (reset) the time counter (S1306), and ends the determination processing for the vessel-raising state ST2.

If the time-dependent difference $\Delta\theta$ of the inclination $\theta$ of the vessel 6 is determined to be smaller than the value of 0 in S1305 (S1305/YES), the body frame state determination unit 190 performs, by the internal time counter, the counting of the cumulative time Ts during which this state will continue (S1307), and confirms whether or not the cumulative time Ts has reached the predetermined time Tb (S1308). If the body frame state determination unit 190 confirms at this time that the cumulative time Ts has not reached the predetermined time Tb (S1308/NO), processing is repeated from S1305.

If the cumulative time Ts is confirmed to have reached the predetermined time Tb in S1308 (S1308/YES), this means that the body frame state ST has changed from the vessel-raising state ST2, which was determined in the preceding determination processing for the body frame state ST, to the vessel-lowering state ST5. The body frame state determination unit 190, therefore, determines the body frame state ST to be the vessel-lowering state ST5 (S1305), and ends the determination processing for the vessel-raising state ST2.

The determination processing for the dumping state ST3 in S1106 as illustrated in FIG. 11 will next be described in detail based on the flowchart of FIG. 14.

Figure 14:
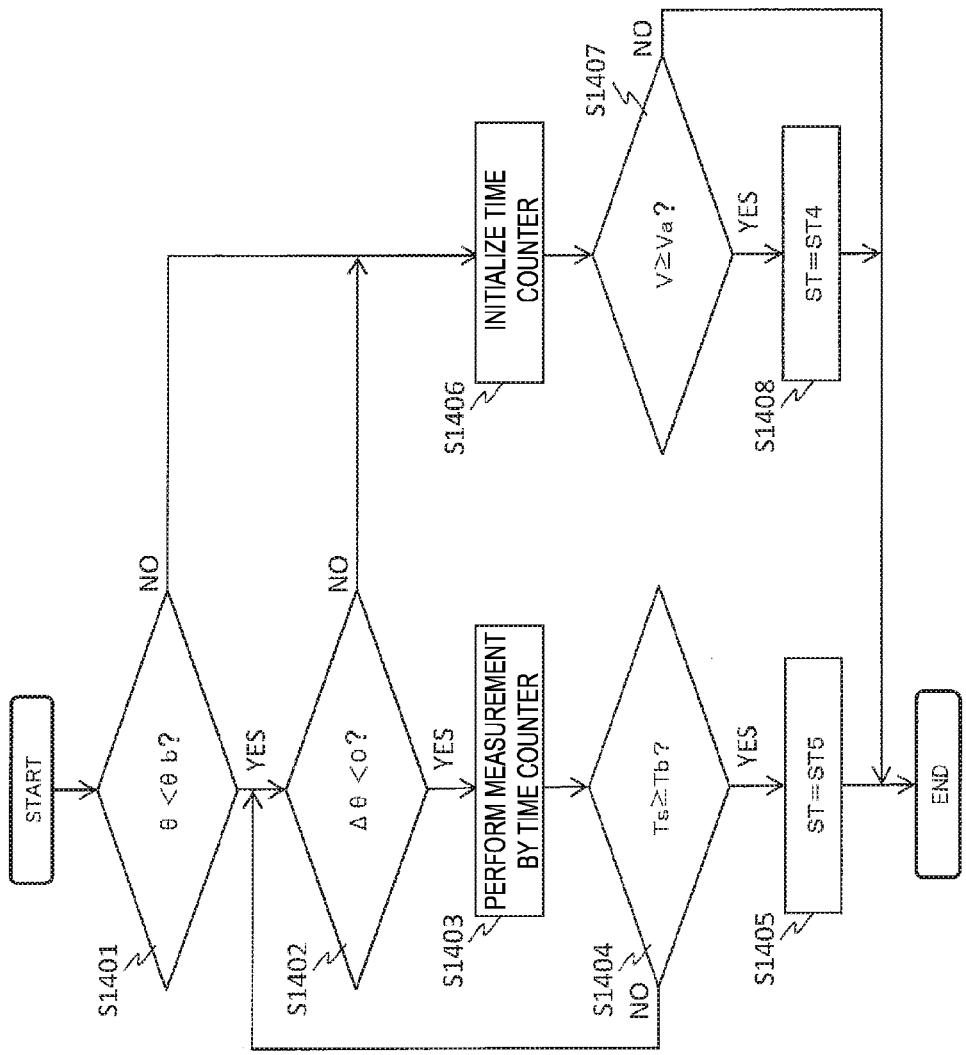
FIG. 14 is a flowchart illustrating a flow of determination processing for a dumping state ST3 in S1106 shown in FIG. 11.

As illustrated in FIG. 14, the body frame state determination unit 190 determines whether or not the inclination θ of the vessel 6 as read in S1002 is smaller than the dumping determination angle θb (S1401). If the inclination θ of the vessel 6 is determined to be smaller than the dumping determination angle θb at this time (S1401/YES), the body frame state determination unit 190 determines whether or not the time-dependent difference Δθ of the inclination θ of the vessel 6, which was obtained from the detection value of the angle sensor 17 as read in S1002, is smaller than the value of 0 (S1402).

If the time-dependent difference Δθ of the suspension pressure P is determined to be smaller than the value of 0 in S1402 (S1402/YES), the body frame state determination unit 190 begins the counting of the cumulative time Ts during which this state will continue (S1404), and confirms whether or not the cumulative time Ts has reached the predetermined time Tb (S1404). If the body frame state determination unit 190 confirms at this time that the cumulative time Ts has not reached the predetermined time Tb (S1404/NO), processing is repeated from S1402.

If the cumulative time Ts is confirmed to have reached the predetermined time Tb in S1404 (S1404/YES), this means that the body frame state ST has changed from the dumping state ST3, which was determined in the preceding determination processing for the body frame state ST, to the vessel-lowering state ST5. The body frame state determination unit 190, therefore, determines the body frame state ST to be the vessel-lowering state ST5 (S1405), and ends the determination processing for the vessel-lowering state ST3.

If the inclination θ of the vessel 6 is determined to be equal to or greater than the dumping determination angle θb on the other hand in S1401 (S1401/NO) or if the time-dependent difference Δθ of the inclination θ of the vessel 6 is determined to be equal to or greater than the value of 0 in S1402 (S1402/NO), the body frame state determination unit 190 sets the count value of the internal time counter at 0 to initialize (reset) the time counter (S1406), and determines whether or not the wheel speed V read in S1002 is equal to or higher than the stop determination speed Va (S1407). If the wheel speed V is determined to be lower than the stop determination speed Va at this time (S1407/NO), the body frame state determination unit 190 ends the determination processing for the dumping state ST3.

If the wheel speed V is determined to be equal to or higher than the stop determination speed Va in S1407 (S1407/YES), this means that the body frame state ST has changed from the dumping state ST3, which was determined in the preceding determination processing for the body frame state ST, to the vessel-raised forward moving state ST4. The body frame state determination unit 190, therefore, determines the body frame state ST to be the vessel-raised forward moving state ST4 (S1408), and ends the determination processing for the dumping state ST3.

The determination processing for the vessel-raised forward moving state ST4 in S1108 as illustrated in FIG. 11 will next be described in detail based on the flowchart of FIG. 15.

Figure 15:
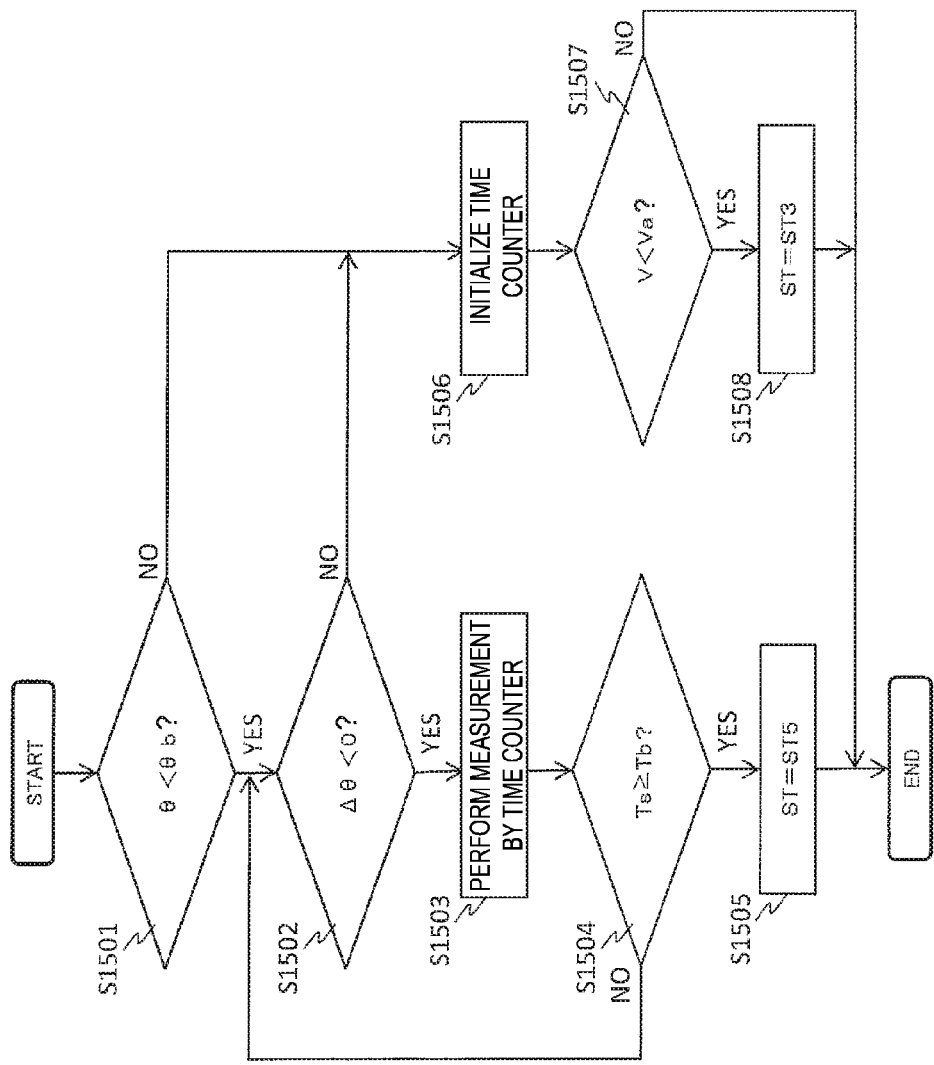
FIG. 15 is a flowchart illustrating a flow of determination processing for a vessel-raised forward moving state ST4 in S1108 shown in FIG. 11.

As illustrated in FIG. 15, the body frame state determination unit 190 determines whether or not the inclination θ of the vessel 6 as read in S1002 is smaller than the dumping determination angle θb (S1501). If the inclination θ of the vessel 6 is determined to be smaller than the dumping determination angle θb at this time (S1501/YES), the body frame state determination unit 190 determines whether or not the time-dependent difference Δθ of the inclination θ of the vessel 6, which was obtained from the detection value of the angle sensor 17 as read in S1002, is smaller than the value of 0 (S1502).

If the time-dependent difference Δθ of the inclination θ of the vessel 6 is determined to be smaller than the value of 0 in S1502 (S1502/YES), the body frame state determination unit 190 performs, by the internal time counter, the counting of the cumulative time Ts during which this state will continue (S1503), and confirms whether or not the cumulative time Ts has reached the predetermined time Tb (S1504). If the body frame state determination unit 190 confirms at this time that the cumulative time Ts has not reached the predetermined time Tb (S1504/NO), processing is repeated from S1502.

If the cumulative time Ts is confirmed to have reached the predetermined time Tb in S1504 (S1504/YES), this means that the body frame state ST has changed from the vessel-raised forward moving state ST4, which was determined in the preceding determination processing for the body frame state ST, to the vessel-lowering state ST5. The body frame state determination unit 190, therefore, determines the body frame state ST to be the vessel-lowering state ST5 (S1505), and ends the determination processing for the vessel-raised forward moving state ST4.

If the inclination θ of the vessel 6 is determined to be equal to or greater than the dumping determination angle θb on the other hand in S1501 (S1501/NO) or if the time-dependent difference Δθ of the inclination θ of the vessel 6 is determined to be equal to or greater than the value of 0 in S1502 (S1502/NO), the body frame state determination unit 190 sets the count value of the internal time counter at 0 to initialize (reset) the time counter (S1506), and determines whether or not the wheel speed V read in S1002 is lower than the stop determination speed Va (S1507). If the wheel speed V is determined to be equal or higher than the stop determination speed Va at this time (S1507/NO), the body frame state determination unit 190 ends the determination processing for the vessel-raised forward moving state ST4.

If the wheel speed V is determined to be lower than the stop determination speed Va in S1507 (S1507/YES), this means that the body frame state ST has changed from the vessel-raised forward moving ST4, which was determined in the preceding determination processing for the body frame state ST, to the dumping state ST3. The body frame state determination unit 190, therefore, determines the body frame state ST to be the dumping state ST3 (S1508), and ends the determination processing for the vessel-raised forward moving state ST4.

The determination processing for the vessel-lowering state ST5 in S1109 as illustrated in FIG. 11 will next be described in detail based on the flowchart of FIG. 16.

Figure 16:
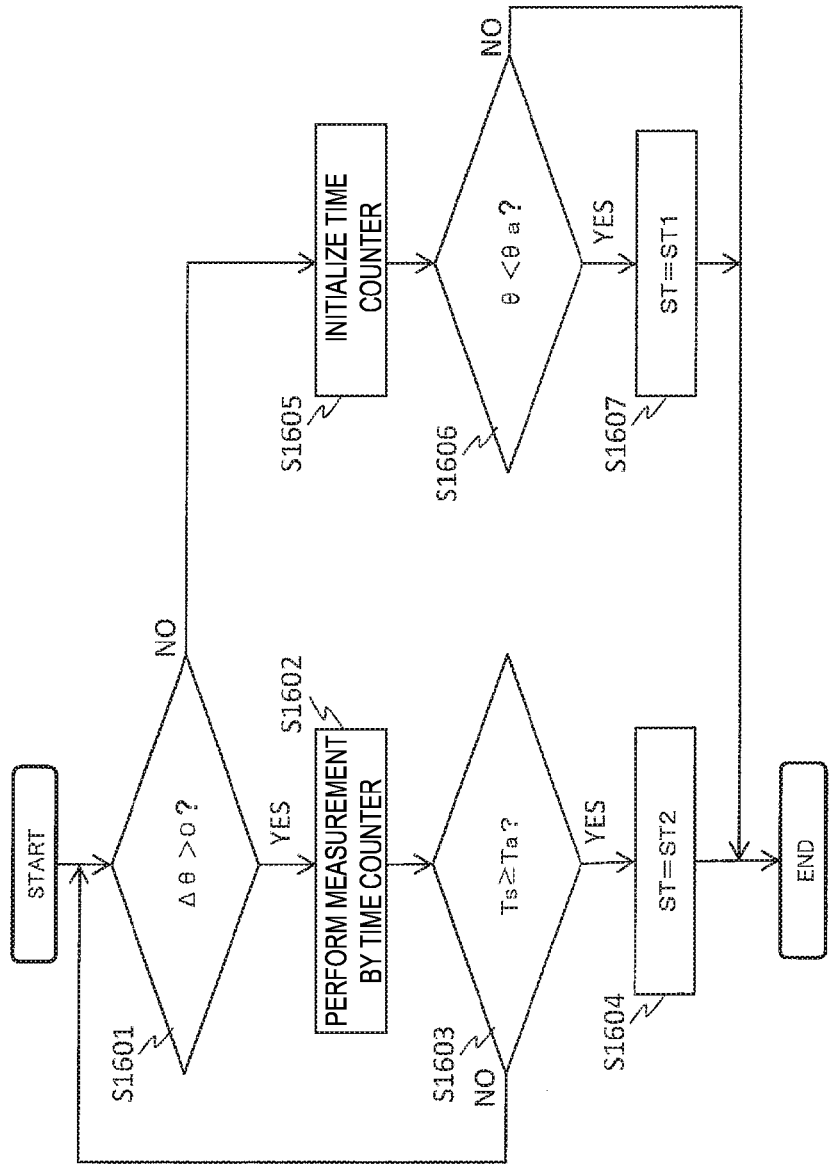
FIG. 16 is a flowchart illustrating a flow of determination processing for a vessel-lowering state ST5 in S1109 shown in FIG. 11.

As illustrated in FIG. 16, the body frame state determination unit 190 determines whether or not the time-dependent difference Δθ of the inclination θ of the vessel 6, which was obtained from the detection value of the angle sensor 17 as read in S1002, is greater than the value 0 (S1601). If the time-dependent difference Δθ of the inclination θ of the vessel 6 is determined to be greater than the value of 0 at this time (S1601/YES), the body frame state determination unit 190 begins, by the internal time counter, the counting of the cumulative time Ts during which this state will continue (S1602), and confirms whether or not the cumulative time Ts has reached the predetermined time Ta (S1603).

If the body frame state determination unit 190 confirms at this time that the cumulative time Ts has not reached the predetermined time Ta (S1603/NO), processing is repeated from S1601. If the cumulative time Ts is confirmed to have reached the predetermined time Ta in S1603 (S1603/YES), this means that the body frame state ST has changed from the vessel-lowering state ST5, which was determined in the preceding determination processing for the body frame state ST, to the vessel-raising state ST2. The body frame state determination unit 190, therefore, determines the body frame state ST to be the vessel-raising state ST2 (S1604), and ends the determination processing for the vessel-lowering state ST5.

If the time-dependent difference Δθ of the inclination θ of the vessel 6 is determined to be equal to or smaller than the value of 0 on the other hand in S1601 (S1601/NO), the body frame state determination unit 190 sets the count value of the internal time counter at 0 to initialize (reset) the time counter (S1605), and determines whether or not the inclination θ of the vessel 6 as read in S1002 is smaller than the resting determination angle θa (S1606). If the inclination θ of the vessel 6 is determined to be equal or greater than the resting determination angle θa at this time (S1606/NO), the body frame state determination unit 190 ends the determination processing for the vessel-lowering state ST5.

If the inclination θ of the vessel 6 is determined to be smaller than the resting determination angle θa in S1606 (S1606/YES), this means that the body frame state ST has changed from the vessel-lowering state ST5, which was determined in the preceding determination processing for the body frame state ST, to the vessel-resting state ST1. The body frame state determination unit 190, therefore, determines the body frame state ST to be the vessel-resting state ST1 (S1607), and ends the determination processing for the vessel-lowering state ST5.

The determination processing for a payload-stuck state by the payload-stuck state determination unit 191 in S1004 as illustrated in FIG. 10 will next be described in detail based on the flowchart of FIG. 17.

Figure 17:
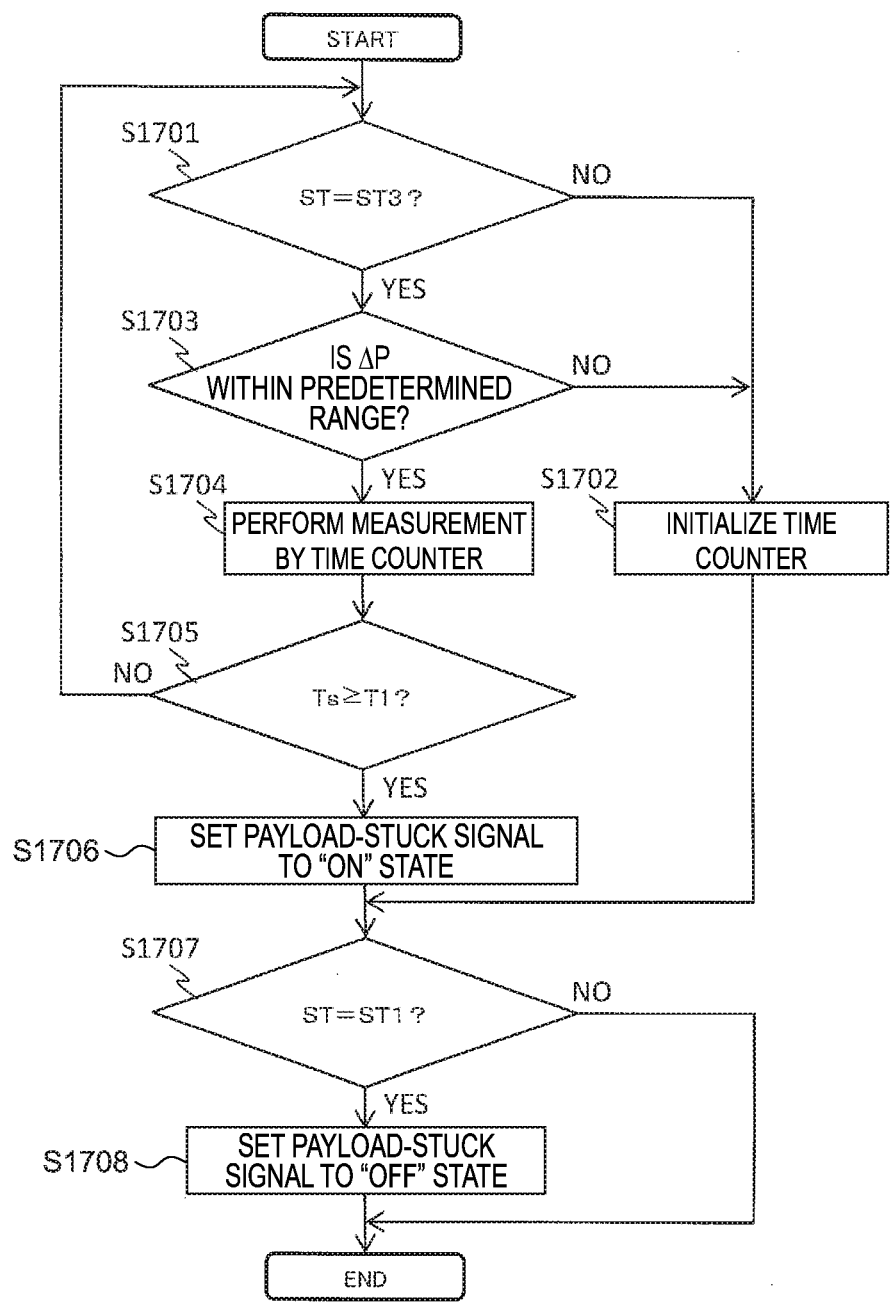
FIG. 17 is a flowchart illustrating a flow of determination processing for a payload-stuck state by a payload-stuck state determination unit in S1004 shown in FIG. 10.

As illustrated in FIG. 17, the payload-stuck state determination unit 191 determines whether or not the body frame state ST determined by the body frame state determination unit 190 is the dumping state ST3 (S1701). If the body frame state ST is determined not to be the dumping state ST3 at this time (S1701/NO), the payload-stuck state determination unit 191 sets the count value of the internal time counter at 0 to initialize (reset) the time counter (S1702), and the below-described processing of S1707 is performed.

If the body frame state ST is determined to be the dumping state ST3 in S1701 (S1701/YES), the payload-stuck state determination unit 191 determines whether or not the time-dependent difference ΔP of the suspension pressure P, which was obtained from the detection value of the pressure sensor 180 as read in S1002, is within a predetermined range (S1703). If the time-dependent difference ΔP of the suspension pressure P is determined to be outside the predetermined range at this time (S1703/NO), processing is repeated from S1702.

If the time-dependent difference ΔP of the suspension pressure P is determined to be within the predetermined range in S1703 (S1703/YES), the payload-stuck state determination unit 191 performs, by the internal time counter, the counting of the cumulative time Ts during which this state will continue (S1704), and determines whether or not the cumulative time Ts has reached a predetermined time T1 (S1705). If the payload-stuck state determination unit 191 determines at this time that the cumulative time Ts has not reached the predetermined time T1 (S1705/NO), processing is repeated from S1701.

If the cumulative time Ts is determined to have reached the predetermined time T1 in S1705 (S1705/YES), the payload-stuck state determination unit 191 sets the payload-stuck signal to ON state (S1706), and determines whether or not the body frame state ST determined by the body frame state determination unit 190 is the vessel-resting state ST1 (S1707).

If the body frame state ST is determined not to be the vessel-resting state ST1 at this time (S1707/NO), the payload-stuck state determination unit 191 ends its determination processing for the payload-stuck state. If the body frame state ST is determined to be the vessel-resting state ST1 on the other hand in S1707 (S1707/YES), the payload-stuck state determination unit 191 sets the payload-stuck signal to OFF state (S1708), and ends its determination processing for the payload-stuck state.

The determination processing for a dumping-completed state by the dumping-completed state determination unit 192 in S1005 as illustrated in FIG. 10 will next be described in detail based on the flowchart of FIG. 18.

Figure 18:
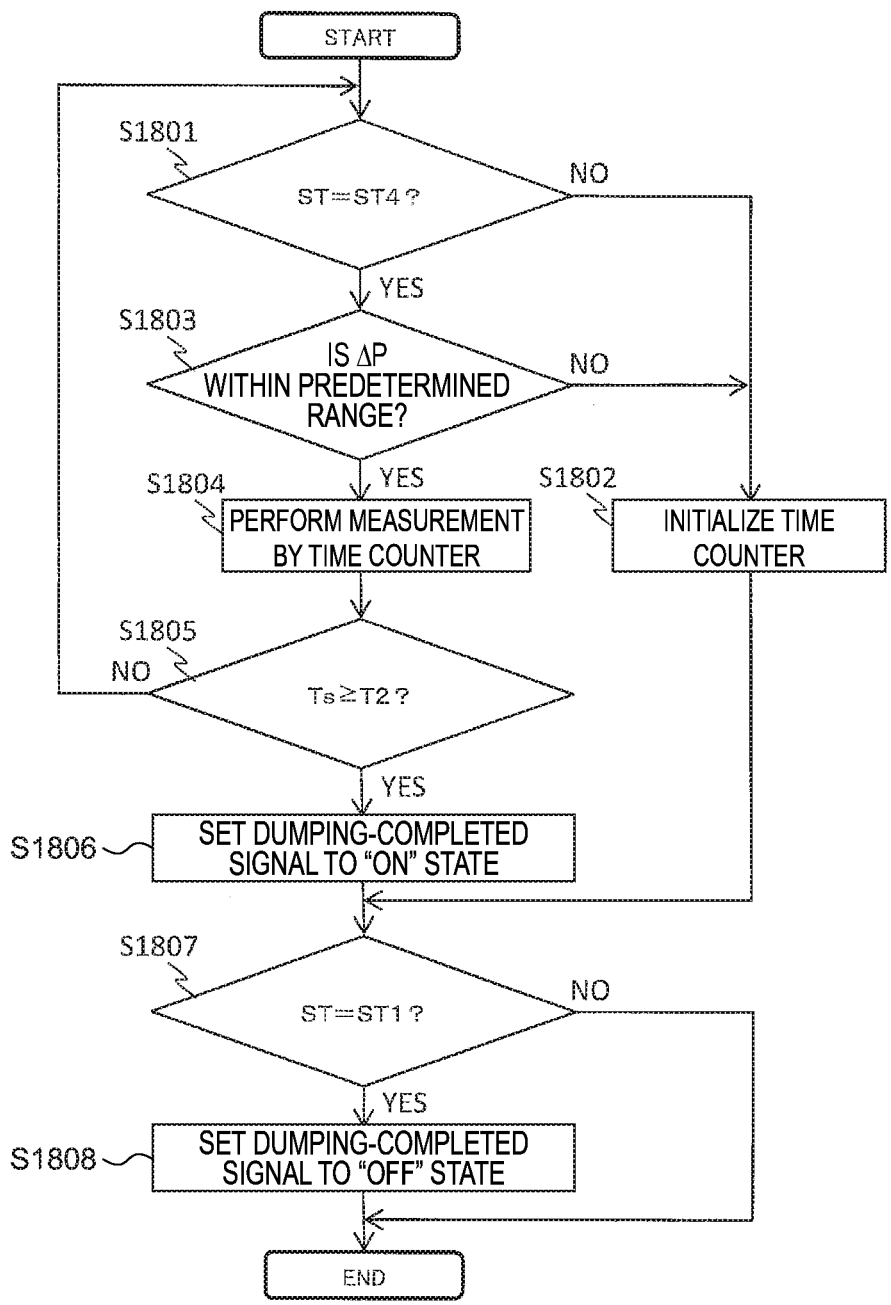
FIG. 18 is a flowchart illustrating a flow of determination processing for dumping-completed state by a dumping-completed state determination unit in S1005 shown in FIG. 10.

As illustrated in FIG. 18, the dumping-completed state determination unit 192 determines whether or not the body frame state ST determined by the body frame state determination unit 190 is the vessel-raised forward moving state ST4 (S1801). If the body frame state ST is determined not to be the vessel-raised forward moving state ST4 at this time (S101/NO), the dumping-completed state determination unit 192 sets the count value of the internal time counter at 0 to initialize (reset) the time counter (S1802), and the below-described processing of S1807 is performed.

If the body frame state ST is determined to be the vessel-raised forward moving state ST4 in S1801 (S1801/YES), the dumping-completed state determination unit 192 determines whether or not the time-dependent difference ΔP of the suspension pressure P, which was obtained from the detection value of the pressure sensor 180 as read in S1002, is within the predetermined range (S1803). If the time-dependent difference ΔP of the suspension pressure P is determined to be outside the predetermined range at this time (S1803/NO), the dumping-completed-state determination unit 192 repeats processing from S1802.

If the time-dependent difference ΔP of the suspension pressure P is determined to be within the predetermined range in S1803 (S1803/YES), the dumping-completed state determination unit 192 performs, by the internal time counter, the counting of the cumulative time Ts during which this state will continue (S1804), and determines whether or not the cumulative time Ts has reached a predetermined time T2 (S1805). If the cumulative time Ts is determined not to have reached the predetermined time T2 at this time (S1805/NO), the dumping-completed state determination unit 192 repeats the processing is repeated from S1801.

If the cumulative time Ts is determined to have reached the predetermined time T2 in S1805 (S1805/YES), the dumping-completed state determination unit 192 sets the dumping-completed signal to ON state (S1806), and determines whether or not the body frame state ST determined by the body frame state determination unit 190 is the vessel-resting state ST1 (S1807).

If the body frame state ST is determined not to be the vessel-resting state ST1 at this time (S1807/NO), the dumping-completed state determination unit 192 ends its determination processing for the dumping-completed state. If the body frame state ST is determined to be the vessel-resting state ST1 on the other hand in S1807 (S1807/YES), the dumping-completed state determination unit 192 sets the dumping-completed signal to OFF state (S1808), and ends its determination processing for the dumping-completed state.

The determination processing for a payload-sticking state by the payload-sticking state determination unit 193 in S1006 as illustrated in FIG. 10 will next be described in detail based on the flowchart of FIG. 19.

Figure 19:
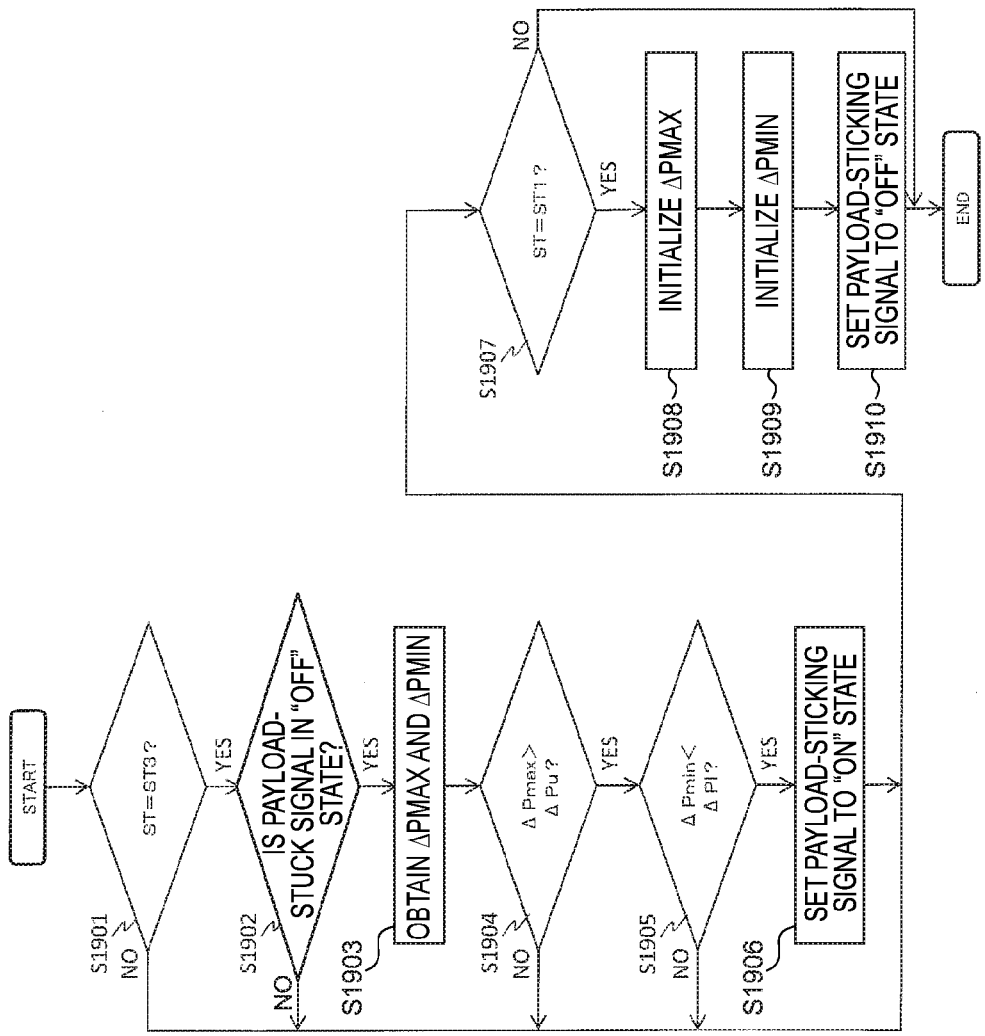
FIG. 19 is a flowchart illustrating a flow of determination processing for payload-sticking state by a payload-sticking state determination unit in S1006 shown in FIG. 10.

As illustrated in FIG. 19, the payload-sticking state determination unit 193 determines whether or not the body frame state ST determined by the body frame state determination unit 190 is the dumping state ST3 (S1901). If the payload-sticking state determination unit 193 determines the body frame state ST not to be the dumping state ST3 at this time (S1901/NO), the below-described processing of S1907 is performed.

If the body frame state ST is determined to be the dumping state ST3 (S1901/YES), the payload-sticking state determination unit 193 confirms whether or not the payload-stuck signal from the payload-stuck determination unit 191 is in OFF state (S1902). If the payload-stuck signal from the payload-stuck determination unit 191 is determined to be in OFF state at this time (S1902/NO), the payload-sticking state determination unit 193 performs the below-described processing of S1907.

If the payload-stuck signal from the payload-stuck state determination unit 191 is determined to be in the OFF state (S1902/YES), the payload-sticking state determination unit 193 monitors fluctuations of the time-dependent difference $\Delta P$ of the suspension pressure P as obtained from the detection value of the pressure sensor 180 as read in S1002, and acquires their maximum value (maximal) $\Delta Pmax$ and minimum value (minimal) $\Delta Pmin$ (S1903).

The payload-sticking state determination unit 193 then determines whether or not the maximum value $\Delta Pmax$ acquired in S1903 is greater than the positive threshold level $\Delta Pu$ (S1904). If the maximum value $\Delta Pmax$ is determined to be equal to or smaller than the positive threshold level $\Delta Pu$ at this time (S1904/NO), the payload-sticking state determination unit 193 performs the below-described processing of S1907.

If the maximum value $\Delta Pmax$ is determined to be greater than the positive threshold level $\Delta Pu$ in S1904 (S1904/YES), the payload-sticking state determination unit 193 determines whether or not the minimum value $\Delta Pmin$ acquired in S1903 is smaller than the negative threshold level $\Delta P1$ (S1905). If the minimum value $\Delta Pmin$ is determined to be equal to or greater than the negative threshold level $\Delta P1$ at this time (S1905/NO), the payload-sticking state determination unit 193 performs the below-described processing of S1907.

If the minimum value $\Delta Pmin$ is determined to be smaller than the negative threshold level $\Delta P1$ in S1905 (S1905/YES), the payload-sticking state determination unit 193 determines the state of loading in the vessel 6 to be the payload-sticking state, and sets the payload-sticking signal to ON state (S1906). The payload-sticking state determination unit 193 next determines whether or not the body frame state ST determined by the body frame state determination unit 190 is the vessel-resting state ST1 (S1907). If the body frame state ST is determined not to be the vessel-resting state ST1 at this time (S1907/NO), the payload-sticking state determination unit 193 ends its determination processing for the payload-sticking state.

If the body frame state ST is determined to be the vessel-resting state ST1 in S1907 (S1907/YES), the payload-sticking state determination unit 193 initializes (resets) the maximum value $\Delta Pmax$ (S1908) and initializes (resets) the minimum value $\Delta Pmin$ (S1909). Then, the payload-sticking state determination unit 193 sets the payload-sticking signal to OFF state (S1910), and ends its determination processing for the payload-sticking state.

The notification processing for the state of loading in the vessel 6 by the display unit 200 in S1007 as illustrated in FIG. 10 will next be described in detail based on the flowchart of FIG. 20.

Figure 20:
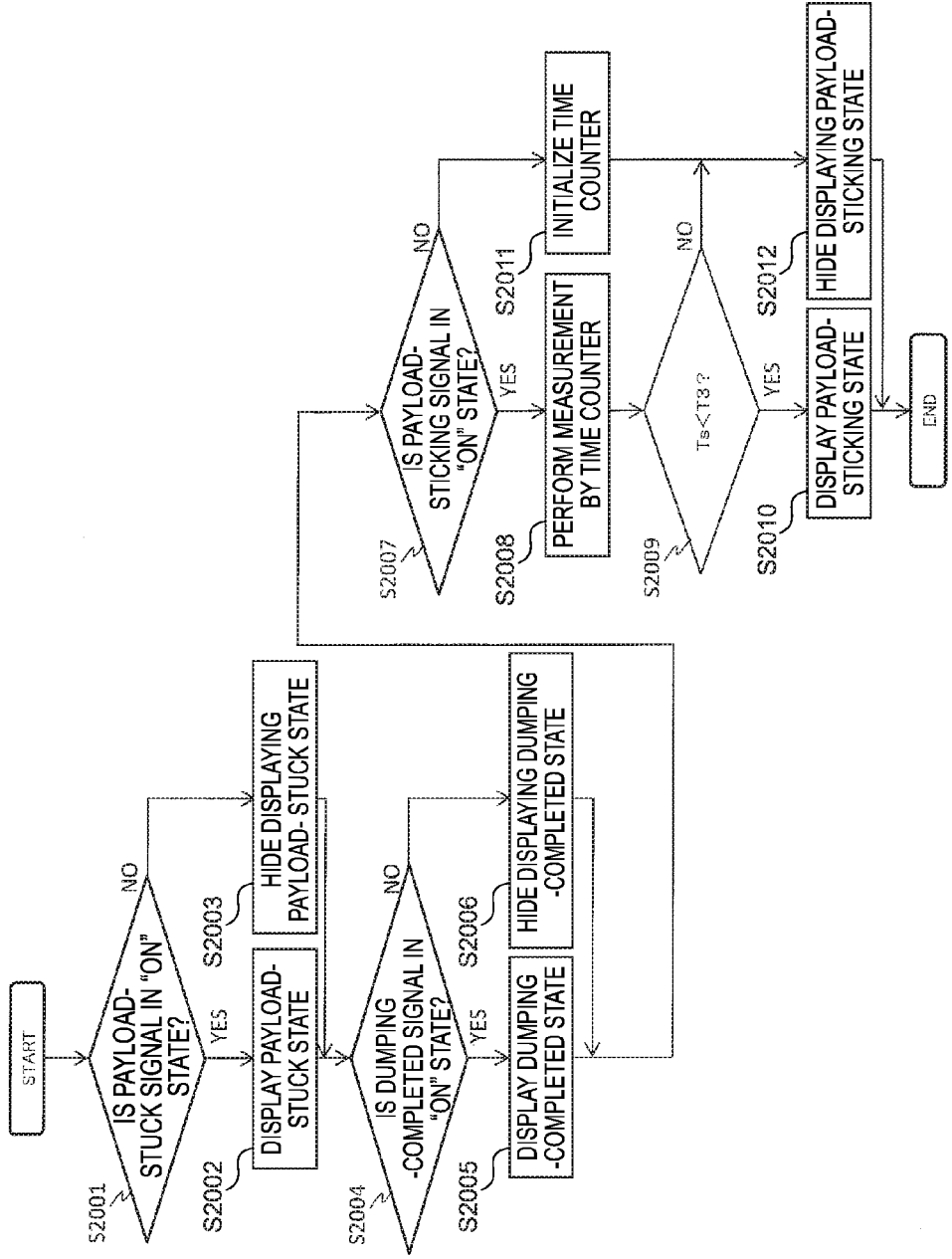
FIG. 20 is a flowchart illustrating a flow of notification processing for the state of loading in the vessel by a display unit in S1007 shown in FIG. 10.

As illustrated in FIG. 20, the display unit 200 confirms whether or not the payload-stuck signal from the payload-stuck state determination unit 191 is in ON state (S2001). If the payload-stuck signal is confirmed to be in ON state at this time (S2001/YES), the display unit 200 displays on a screen that the state of loading in the vessel 6 is a payload-stuck state (S2002), and the below-described processing of S2004 is performed.

If the payload-stuck signal is confirmed to be in OFF state in S2001 (S2001/NO), the display unit 200 hides from the screen the display that the state of loading in the vessel 6 is the payload-stuck state (S2003), and confirms whether or not the dumping-completed signal from the dumping-completed state determination unit 192 is in ON state (S2004). If the dumping-completed signal is confirmed to be in ON state at this time (S2004/YES), the display unit 200 displays on the screen that the state of loading in the vessel 6 is the dumping-completed state (S2005), and the below-described processing of S2007 is performed.

If the dumping-completed signal is confirmed to be in OFF state in S2004 (S2004/NO), the display unit 200 hides from the screen the display that the state of loading in the vessel 6 is the dumping-completed state (S2006), and confirms that the payload-struck signal from the payload-sticking state determination unit 193 is in ON state (S2007). If the payload-sticking signal is confirmed to be in ON state at this time (S2007/YES), the display unit 200 performs, by the internal time counter, the counting of the cumulative time Ts during which this state will continue (S2008), and determines whether or not the cumulative time Ts has reached a predetermined time T3 (S2009).

If the cumulative time Ts is determined not to have reached the predetermined time T3 in S2009 (S2009/YES), the display unit 200 displays on the screen that the state of loading in the vessel 6 is the payload-sticking state (S2010), and ends its notification processing of the state of loading in the vessel 6.

If the payload-sticking signal is confirmed to be in OFF state on the other hand in S2007 (S2007/NO), the display unit 200 sets the count value of the internal time counter at 0 to initialize (reset) the time counter (S2001), and the below-described processing of S2012 is performed. If the cumulative time Ts is determined to have reached the predetermined time T3 in S2009 (S2009/NO), the display unit 200 hides from the screen the display that the state of loading in the vessel 6 is the payload-sticking state (S2012), and ends its notification processing of the state of loading in the vessel 6.

Even if a state arises with the earth 5 being stuck in the vessel 6 upon dumping the earth 5 from the vessel 6 onto a flat ground surface, the dumping work determination system 100 according to the first embodiment of the present invention configured as described above allows the operator in the cab 11 to easily ascertain the current state of loading in the vessel 6 by confirming the screen of the display unit 200. At the moment that the earth 5 has become trapped in the vessel 6, the earth 5 that still remains in the vessel 6 can hence be quickly dumped by operating the accelerator pedal or the like to allow the body frame to move forward. As a consequence, it is possible to shorten the time until the earth 5 is emptied in its entirety from the vessel 6 and therefore to improve the efficiency of dumping work.

After the body frame state ST has changed from the dumping state ST3 to the vessel-raised forward moving state ST4, the dumping work determination system 100 according to the first embodiment of the present invention also allows the operator to easily ascertain from the screen of the display unit 200 that the state of loading in the vessel 6 has changed to a dumping-completed state, in other words, the vessel 6 has become empty. Therefore, the operator can lower the vessel 6 by manipulating or operating the hoist control lever, accelerator pedal and the like, and can also accelerate the wheels to move the dump truck 1 promptly to a loading site for the earth 5. As a consequence, the haulage work by the dump truck 1 can be efficiently performed.

Focusing on the existence of a period of time, during which the suspension pressure P remains constant when the body frame state ST is the dumping state ST3 or vessel-raised forward moving state ST4, because the load capacity of the vessel 6 that the dump truck 1 can haul is specified beforehand, the dumping work determination system 100 according to the first embodiment of the present invention also allows to determine the state of loading in the vessel 6 with good precision by detecting with the pressure sensor 180 the suspension pressure P in one of the rear suspension cylinders 8 to which upon dumping the earth 5, shakes of the vessel 6 are directly transmitted. As a consequence, excellent reliability can be assured for the determination of the state of loading in the vessel 6 by the dumping work determination system 100.

Further, the dumping work determination system 100 according to the first embodiment of the present invention also allows the operator to readily ascertain from the screen of the display unit 200 that the state of loading in the vessel 6 has become a payload-sticking state after the change of the body frame state ST from the vessel-raising state ST2 to the dumping state ST3. The operator can, therefore, shake off the high-stickiness earth 5, which is stuck on the vessel 6, to the outside by manipulating the hoist control lever to repeat the extension/retraction of the hoist cylinders 142 for shaking the vessel 6 up and down or by operating the accelerator pedal and brake pedal to repeat the operation that the body frame is stopped immediately after allowing it to move forward. As a consequence, the efficiency of dumping work from the dump truck 1 can be enhanced.

Furthermore, with the dumping work determination system 100 according to the first embodiment of the present invention, the operator can smoothly perform the confirmation work of the state of loading in the vessel 6 because in dumping work, the display unit 200 in the cab 11 is configured to display on the screen which one of the payload-stuck state, dumping-completed state and payload-sticking state the body frame state is. As a consequence, the operator's convenience in dumping work can be improved.

Second Embodiment

Figure 21:
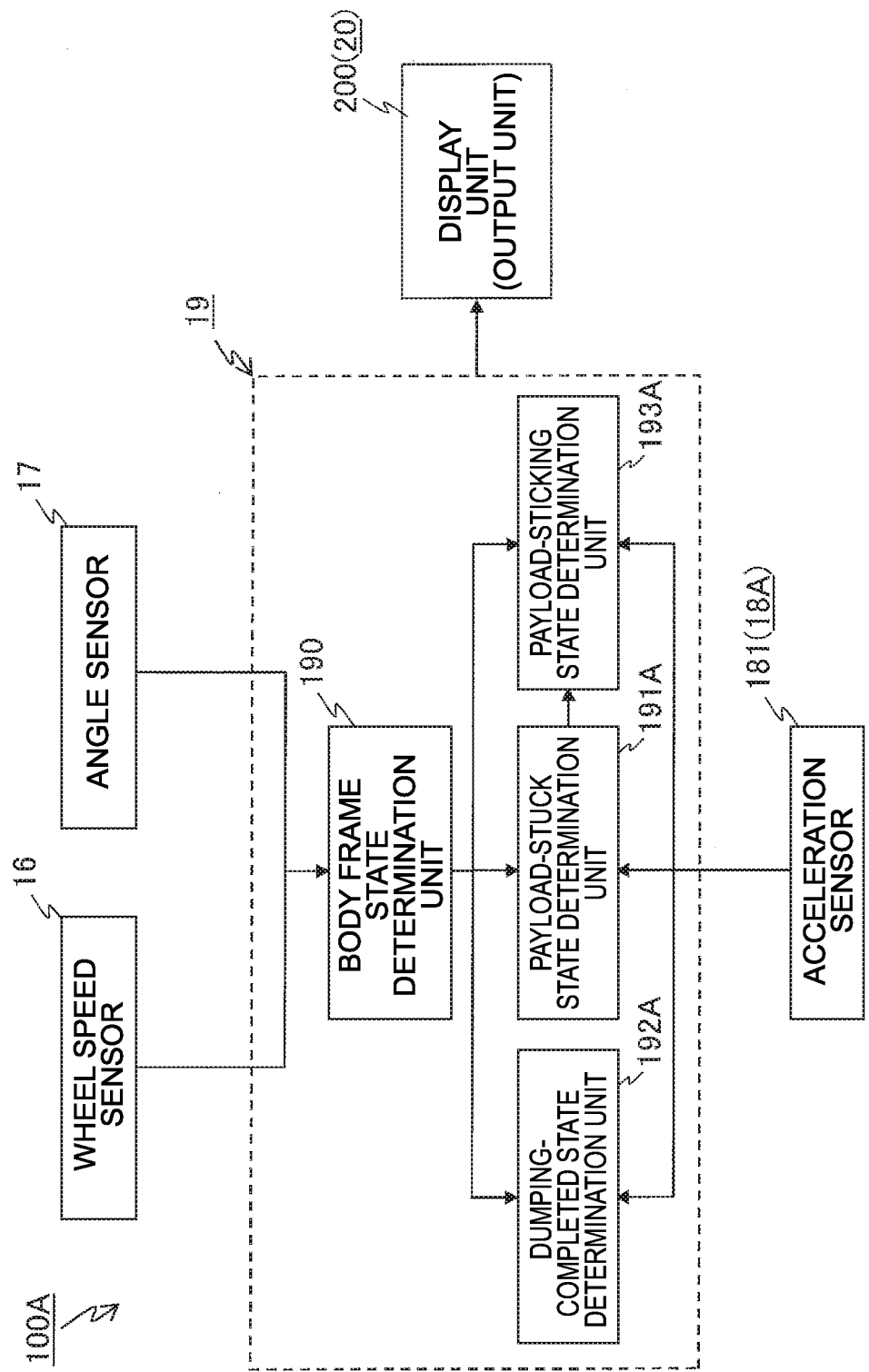
FIG. 21 is a diagram depicting the configuration of a dumping work determination system according to a second embodiment of the present invention.

The second embodiment of the present invention is different from the above-mentioned first embodiment in that, while the shake detector 18 in the first embodiment is comprised of the pressure sensor 180 to detect the suspension pressure P in one of the rear suspension cylinders 8, a shake detector 18A in the second embodiment is, as depicted in FIG. 21, attached to the vessel 6, for example, in the vicinity of the connecting pin 141 and comprised of an acceleration sensor 181 as an acceleration detector to detect the acceleration A (see FIG. 22) of the vessel 6.

Figure 22:
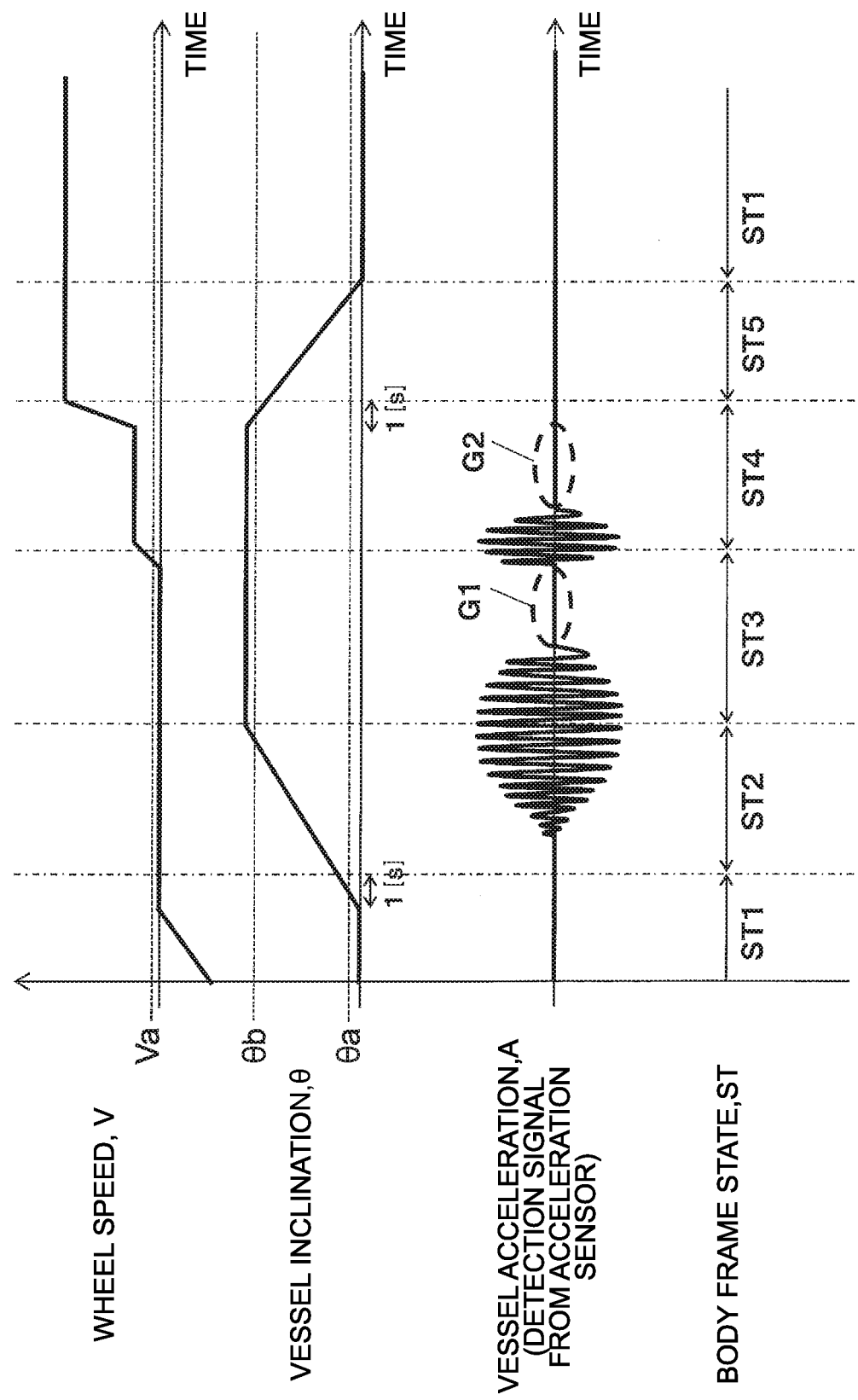
FIG. 22 is a graph showing time series variations of wheel speed V, vessel inclination θ, vessel acceleration A, and body frame state ST when earth the stickiness of which is not high is dumped from a vessel.

A payload-stuck state determination unit 191A in the second embodiment of the present invention determines the state of loading in the vessel 6 to be a payload-stuck state when as shown in FIG. 22, for example, the vehicle speed V detected by the wheel speed sensor 16 is lower than the stop determination speed Va (V<Va), the inclination θ of the vessel 6 as detected by the angle sensor 17 is equal to or greater than the dumping determination angle θb (θ≥θb), and the acceleration A of the vessel 6 as detected by the acceleration sensor 181 remains within a predetermined range (for example, a small range set around the value of 0) for the predetermined time T1 (for example, 1 second).

A dumping-completed state determination unit 192A in the second embodiment of the present invention determines the state of loading in the vessel 6 to be a dumping-completed state, for example, when the vehicle speed V detected by the wheel speed sensor 16 is equal to or higher than the stop determination speed Va (V≥Va), the inclination θ of the vessel 6 as detected by the angle sensor 17 is equal to or greater than the dumping determination angle θb (θ≥θb), and the acceleration A of the vessel 6 as detected by the acceleration sensor 181 remains within a predetermined range (for example, a small range set around the value of 0) for the predetermined time T2 (for example, 1 second).

Figure 23:
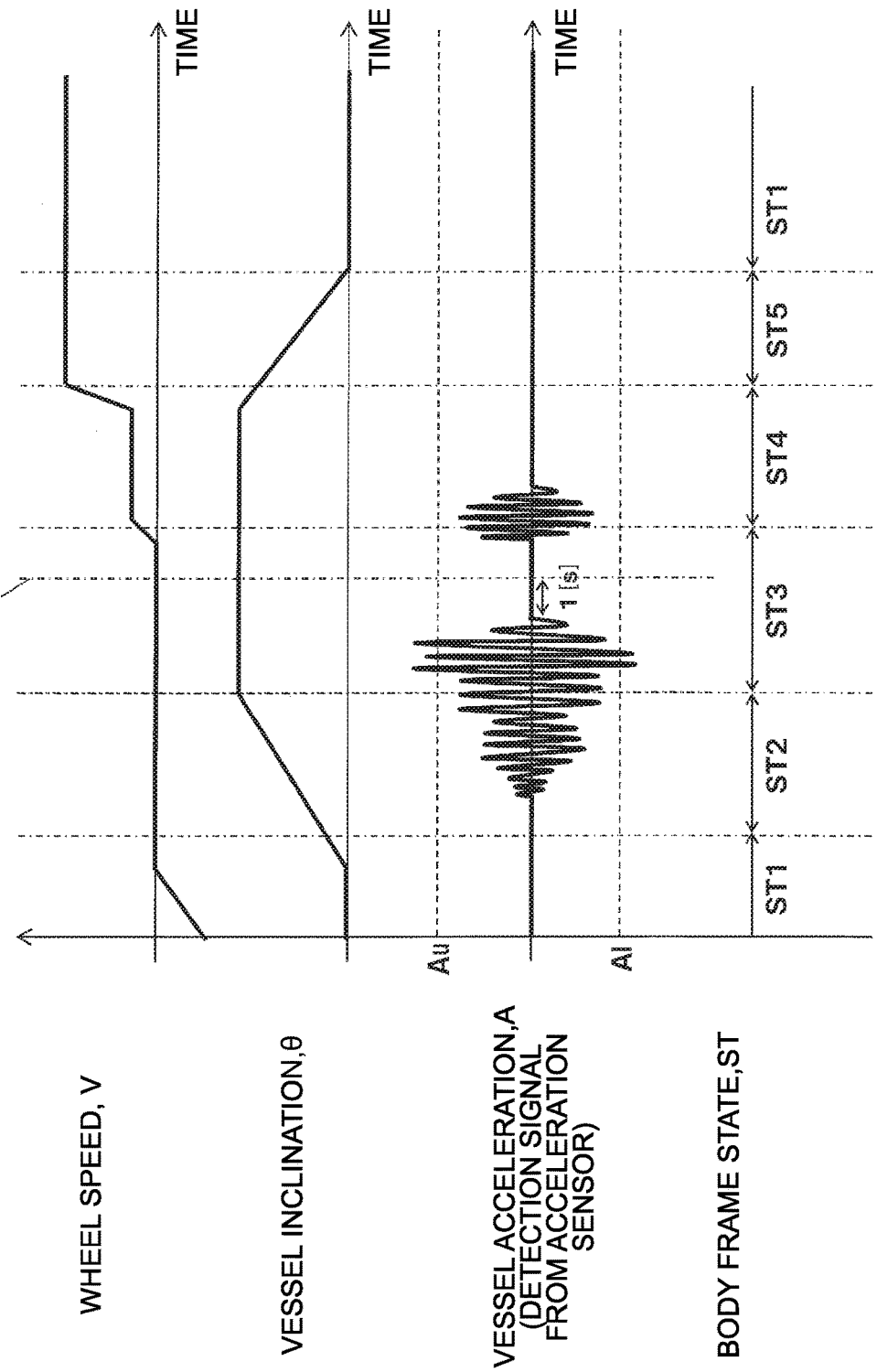
FIG. 23 is a graph showing time series variations of wheel speed V, vessel inclination θ, vessel acceleration A, and body frame state ST when earth the stickiness of which is high is dumped from the vessel.

A payload-sticking state determination unit 193A in the second embodiment of the present invention determines the state of loading in the vessel 6 to be a payload-sticking state when as shown in FIG. 23, for example, the body frame state ST is determined to be the dumping state ST3 by the body frame state determination unit 190, the state of loading in the vessel 6 is determined not to be a payload-stuck state by the payload-stuck state determination unit 191, and the deviation of the acceleration A of the vessel 6 as detected by the acceleration sensor 181 becomes greater than a predetermined deviation. The remaining configuration of the second embodiment is the same as in the first embodiment, and elements that overlap or correspond to those in the first embodiment are designated by the same reference signs, and overlapping description is omitted.

With a dumping work determination system 100A according to the second embodiment of the present invention configured as described above, it is still possible to obtain similar advantageous effects as the above-mentioned first embodiment. It is to be noted that the payload-sticking state determination unit 193A is not limited to the above-mentioned configuration but may determine the state of loading in the vessel 6 to be a payload-sticking state when instead of using the deviation of the acceleration A of the vessel 6, the acceleration A of the vessel 6 as detected by the acceleration sensor 181 has varied to exceed the preset positive threshold level Au or negative threshold level Al.

Third Embodiment

Figure 24:
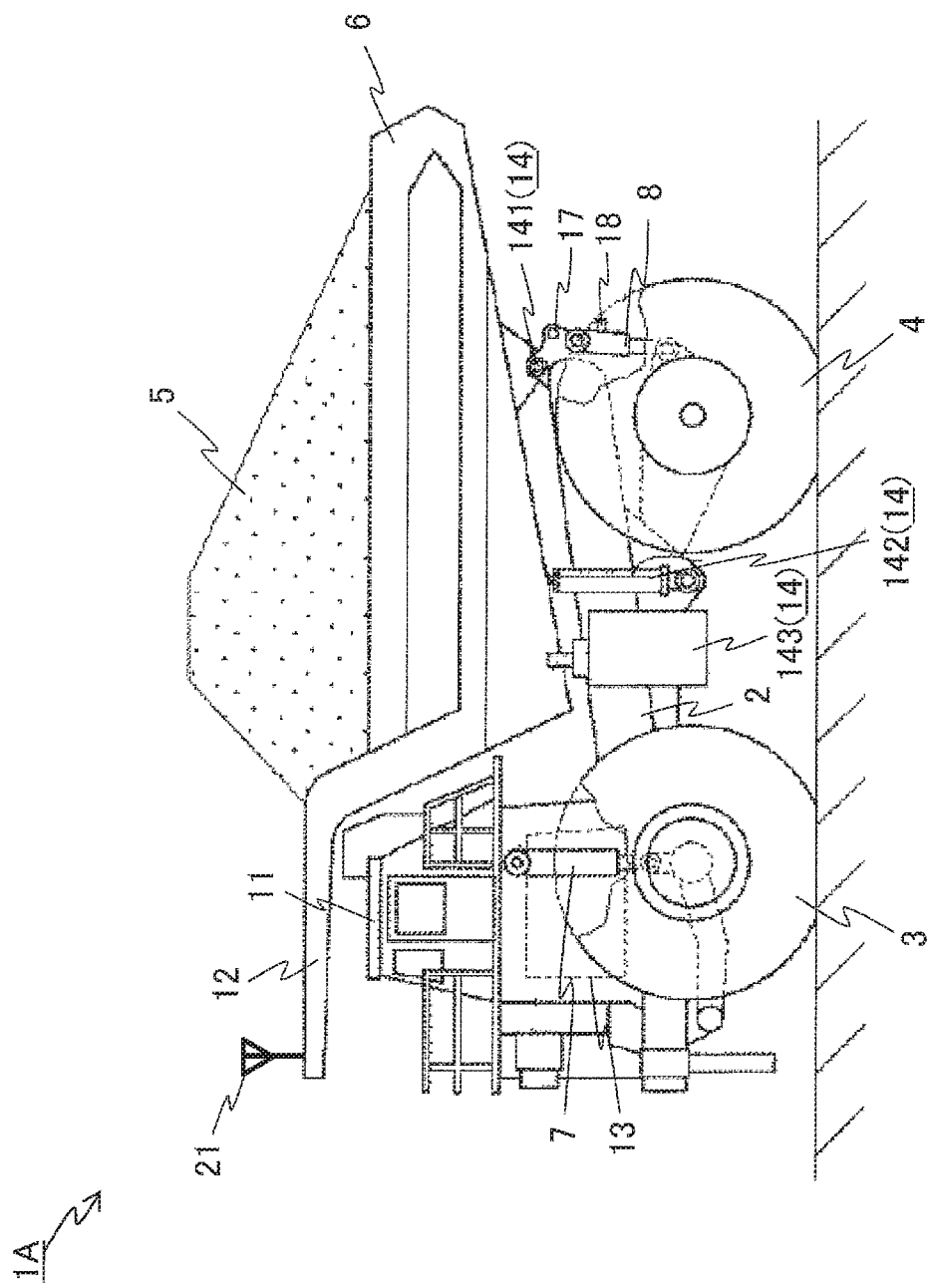
FIG. 24 is a side view showing the configuration of a dump truck mentioned as an example of a haulage vehicle to which a third embodiment of a dumping work determination system according to the present invention can be applied.

The third embodiment of the present invention is different from the above-mentioned first embodiment in that, while the dump truck 1 to which the dumping work determination system of the first embodiment is applied is configured of the manned vehicle operated by the operator riding thereon, a dump truck 1A to which a dumping work determination system 100B (see FIG. 25) of the third embodiment is applied is configured, as shown in FIG. 24, of an unmanned vehicle which autonomously travels along a travel route set beforehand.

Specifically, the dump truck 1A has a wireless unit 21 provided on a front section of a body frame, and is configured to autonomously travel along a travel route in accordance with instructions from a control system (not shown) to which the wireless unit 21 is connected for communications via a wireless network.

Figure 25:
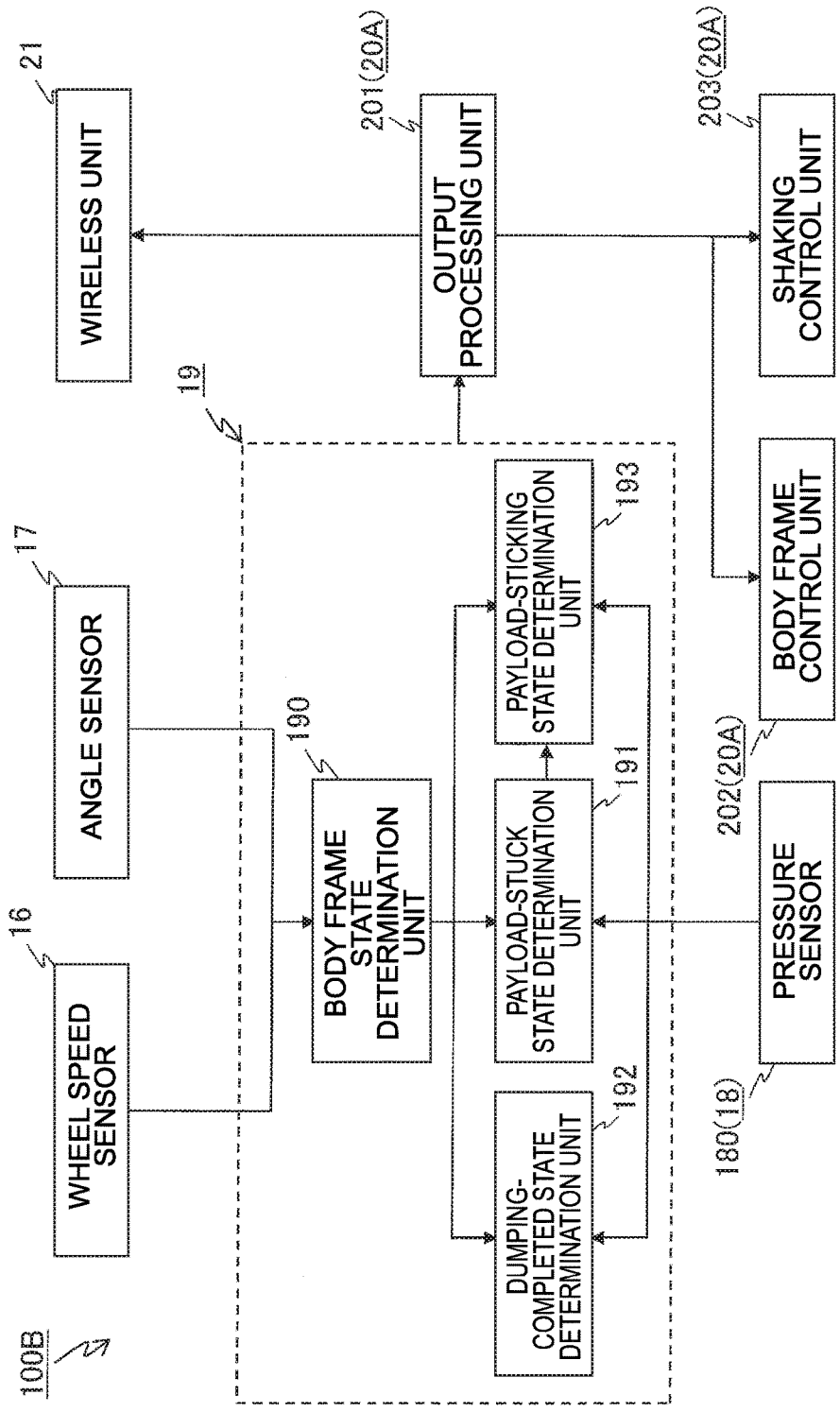
FIG. 25 is a diagram depicting the configuration of a dumping work determination system according to the third embodiment of the present invention.

As depicted in FIG. 25, an output unit 20A in the third embodiment of the present invention includes, for example, an output processing unit 201 in place of the display unit 200 in the first embodiment, the body frame control unit 202, and a shaking control unit 203. The output processing unit 201 performs processing to output various information, such as determination results, to the wireless unit 21 and a below-described body frame control unit 202, both of which are mounted on the dump truck 1A. The body frame control unit 202 controls operations of the travel drive unit and drive mechanism 14, both of which are mounted on the dump truck 1A, with reference to information from the output processing unit 201. The shaking control unit 203 performs control to shake the vessel 6 with reference to information from the output processing unit 201.

Specifically, the body frame control unit 202 performs control to allow the dump truck 1A to move forward by operating the travel drive unit when the state of loading in the vessel 6 is determined to be a payload-stuck state by the payload-stuck state determination unit 191, and also performs control to lift down and lower the vessel 6 by operating the drive mechanism 14 when the state of loading in the vessel 6 is determined to be a dumping-completed state by the dumping-completed state determination unit 192.

Figure 26:
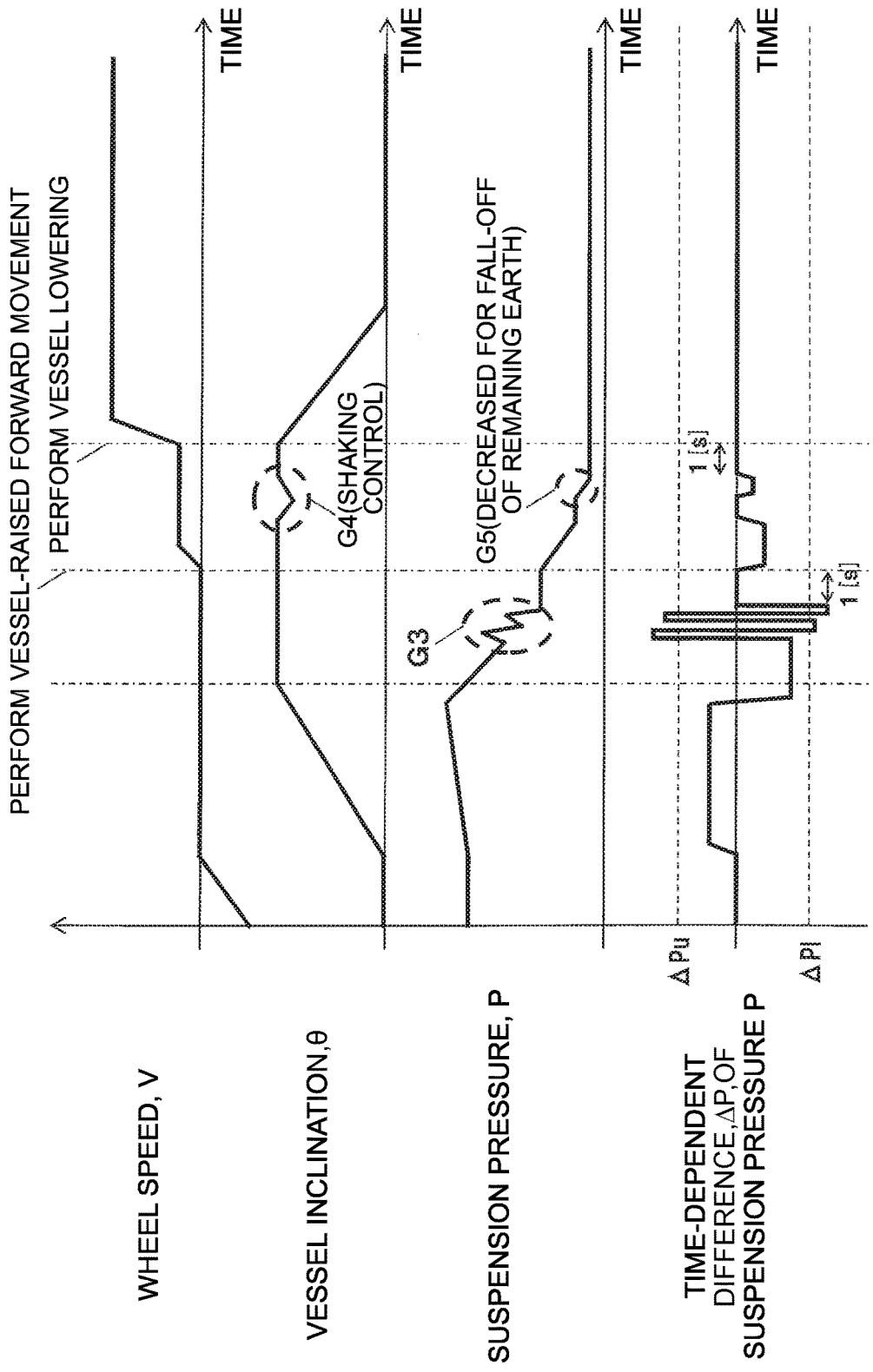
FIG. 26 is a graph showing time series variations of wheel speed V, vessel inclination θ, suspension pressure P, and time-dependent difference ΔP of suspension pressure P when a shaking control unit shown in FIG. 25 has shaken the vessel up and down.

The shaking control unit 203 is configured, for example, to shake the vessel 6 up and down by automatically repeating extension and contraction of the hoist cylinders 142 when the state of loading in the vessel 6 is determined to be a payload-sticking state by the payload-sticking state determination unit 193. As shown in FIG. 26, the body frame state, therefore, changes to a state (payload-sticking state) G3 that the suspension pressure P changes at short intervals and then to a state G4 that the inclination θ of the vessel 6 changes a little by the shaking control unit 203. Because a state G5 that the suspension pressure P decreases is observed shortly after the state G4, it is ascertained that the residual earth 5 stuck on the vessel 6 has been dumped to the outside.

Figure 27:
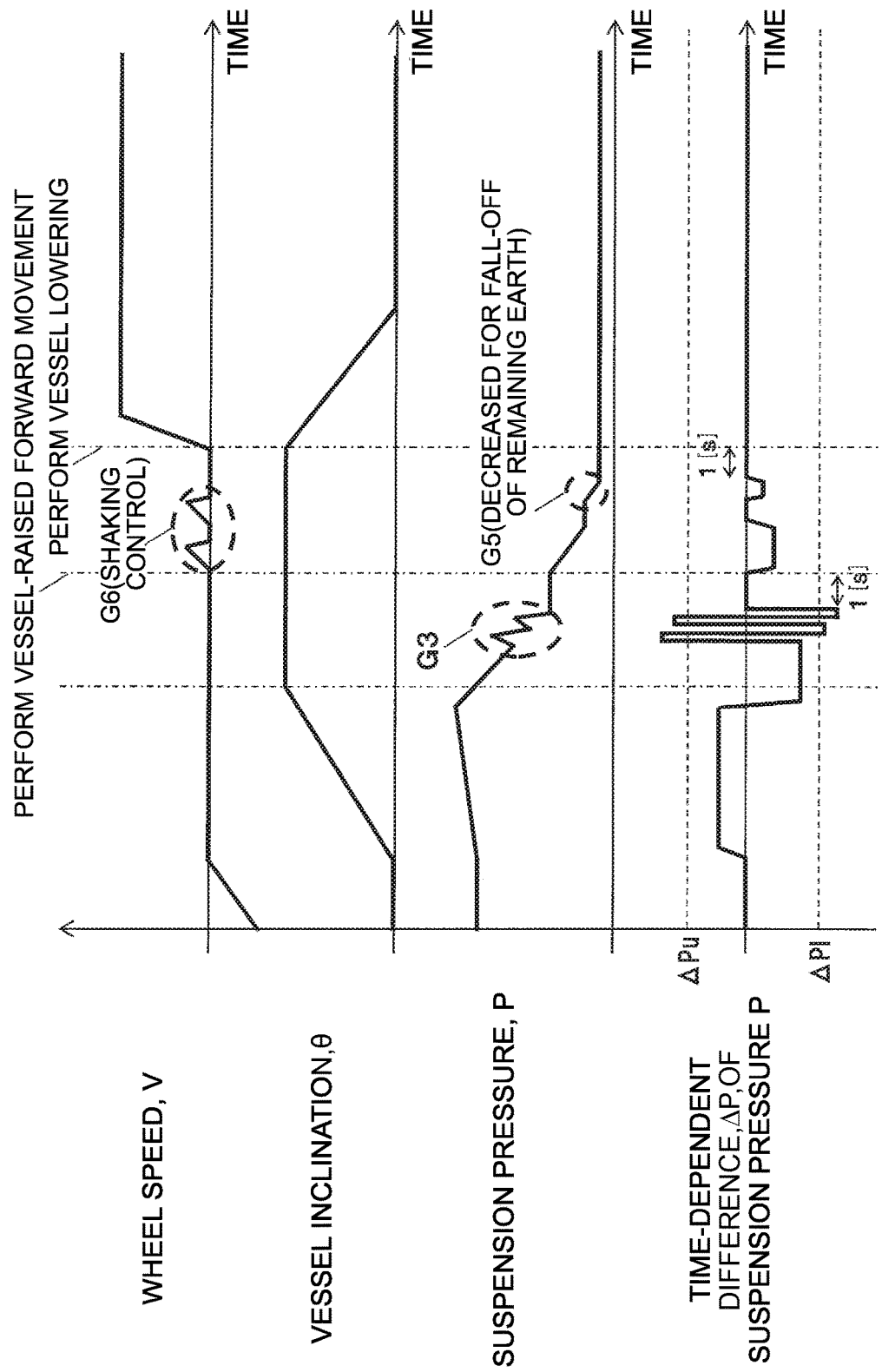
FIG. 27 is a graph showing time series variations of wheel speed V, vessel inclination Δ, suspension pressure, P, and time-dependent difference ΔP of suspension pressure P when the shaking control unit shown in FIG. 25 has shaken the vessel back and forth.

As an alternative, the shaking control unit 203 may be configured, for example, to automatically repeat an operation, in which the body frame is stopped shortly after its forward movement by the travel drive unit, to shake the vessel 6 back and forth when the state of loading in the vessel 6 is determined to be a payload-sticking state by the payload-sticking state determination unit 193. As shown in FIG. 27, the body frame state, therefore, changes to a state (payload-sticking state) G3 that the suspension pressure P changes at short intervals, and then to a state G6 that the wheel speed V changes a little twice by the shaking control unit 203. Because a state G5 that the suspension pressure P decreases is observed shortly after the state G6, it is ascertained that the residual earth 5 stuck on the vessel 6 has been dumped to the outside. The remaining configuration of the third embodiment is the same as in the first embodiment, and elements that overlap or correspond to those in the first embodiment are designated by the same reference signs, and overlapping description is omitted.

With the dumping work determination system 100B according to the third embodiment of the present invention configured as described above, it is still possible to obtain similar advantageous effects as the above-mentioned first embodiment. In addition, the dump truck 1A is allowed to automatically move forward when the state of loading in the vessel 6 changes to a payload-stuck state in dumping work, and the vessel 6 is automatically lifted down when the state of loading in the vessel 6 changes to a dumping-completed state. Therefore, the dumping work determination system 100B according to the third embodiment of the present invention can also efficiently perform dumping work with the dump truck 1A as an unmanned vehicle. It is also to be noted that, when an operator is on the unmanned vehicle, the operator may perform operations such as traveling and dumping with priority over instructions from the control system and only dumping work may be automated by the operator's choice.

Now assume that the state of loading in the vessel 6 has changed to a payload-sticking state in dumping work. With the dumping work determination system 100B according to the third embodiment of the present invention, the high-stickiness earth 5 stuck in the vessel 6 can be easily shaken off to the outside by allowing the vessel 6 to automatically shake up and down or to automatically shake the vessel 6 back and forth with the shaking control unit 203. As a consequence, the efficiency of dumping work from the dump truck 1A can be enhanced.

Fourth Embodiment

Figure 28:
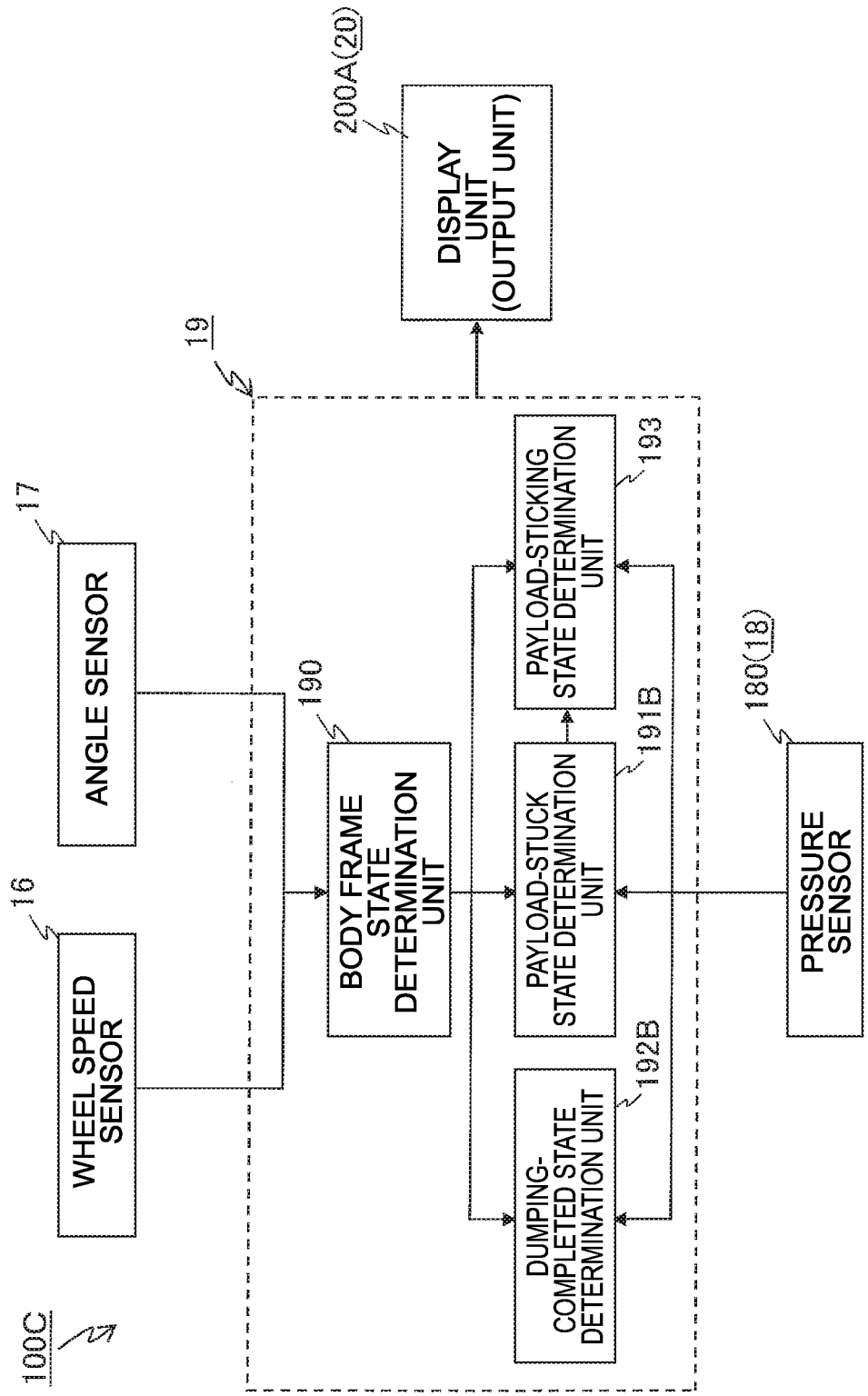
FIG. 28 is a diagram depicting the configuration of a dumping work determination system according to a fourth embodiment of the present invention.

A dumping work determination system 100C according to the fourth embodiment of the present invention includes, as depicted in FIG. 28, a payload-stuck state determination unit 191B, a dumping-completed state determination unit 192B and a display unit 200A in place of the payload-stuck state determination unit 191, dumping-completed state determination unit 192 and display unit 200 in the above-mentioned first embodiment. The payload-stuck state determination unit 191B is configured to stop the determination for a payload-stuck state unless the time-dependent difference ΔP of the suspension pressure P as obtained from the detection value of the pressure sensor 180 is confirmed to have remained within a predetermined range during the predetermined time T1 in a preset period of time T4 from the determination of the body frame state ST as the dumping state ST3 by the body frame state determination unit 190.

The dumping-completed state determination unit 192B is configured to stop the determination of a dumping-completed state unless the time-dependent difference ΔP of the suspension pressure P as obtained from the detection value of the pressure sensor 180 is confirmed to have remained within a predetermined range during the predetermined time T2 in a preset period of time T5 from the determination of the body frame state ST as the vessel-raised forward moving state ST4 by the body frame state determination unit 190.

Further, a display unit 200A is configured to display that the determination of the state of loading in the vessel 6 cannot be performed when the determination of a payload-stuck state by the payload-stuck state determination unit 191B is stopped or the determination of a dumping-completed state by the dumping-completed state determination unit 192B is stopped. The remaining configuration of the fourth embodiment is the same as in the first embodiment, and elements that overlap or correspond to those in the first embodiment are designated by the same reference signs, and overlapping description is omitted.

The determination processing for a payload-stuck state by the payload-stuck state determination unit 191B in the fourth embodiment of the present invention will next be described in detail based on the flowchart of FIG. 29. It is to be noted that the determination processing for the payload-stuck state by the payload-stuck state determination unit 191B in the fourth embodiment of the present invention includes processing similar to the above-mentioned processing of S1701 to S1708 illustrated in FIG. 17, and overlapping description is omitted. It is also to be noted that the payload-stuck state determination unit 191B has two time counters internally mounted to count two different time ranges, and signs A and B are applied to these time counters, respectively, to distinguish them from each other.

Figure 29:
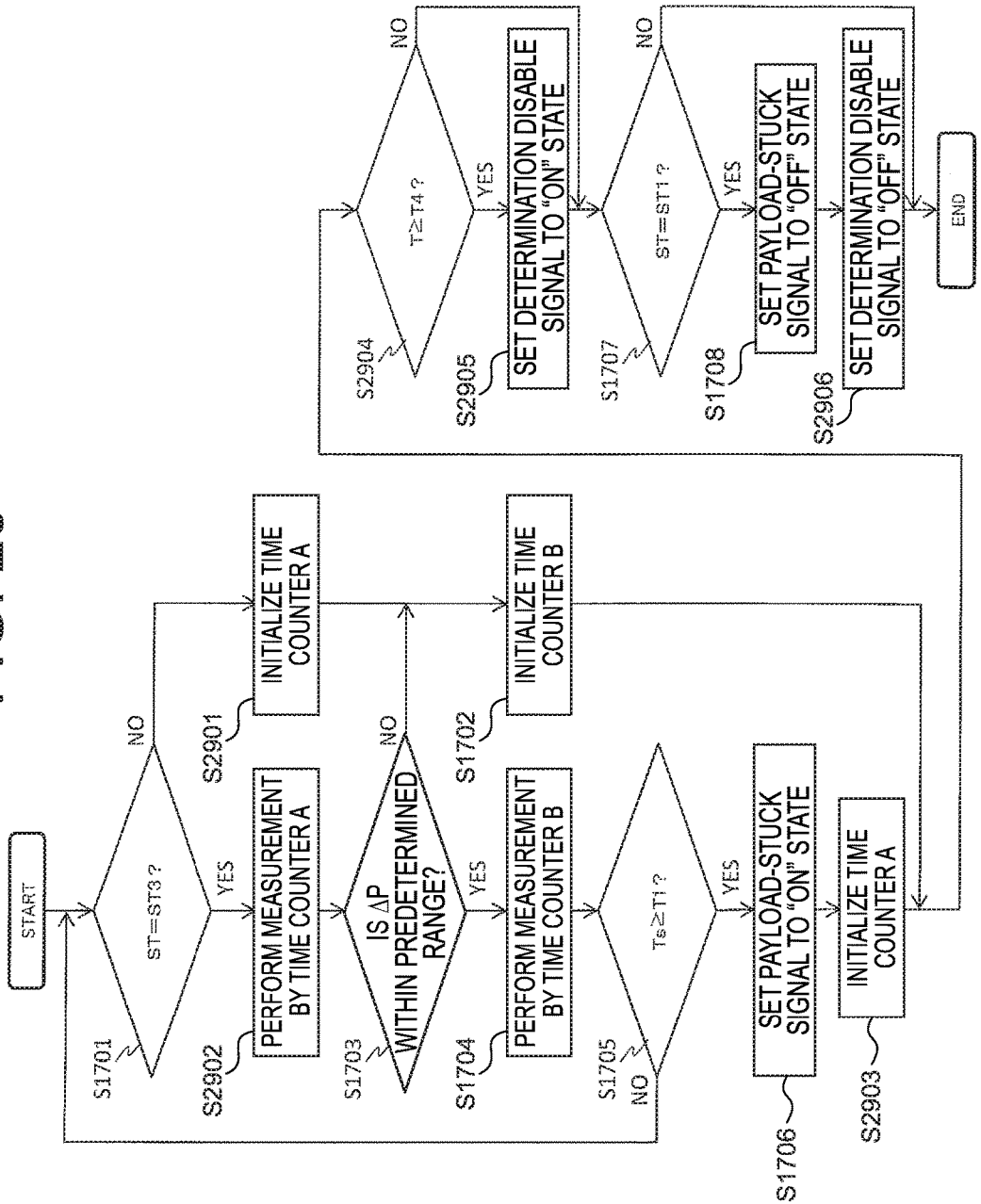
FIG. 29 is a flowchart illustrating a flow of determination processing for a payload-stuck state by a payload-stuck state determination unit in the fourth embodiment of the present invention.

As illustrated in FIG. 29, if the body frame state ST is determined not to be the dumping state ST3 in S1701 (S1701/NO), the payload-stuck state determination unit 191B sets the count value of the internal time counter A at 0 to initialize (reset) the time counter A (S2901), and processing is performed from S1702. If the body frame state ST is determined to be the dumping state ST3 in S1701 (S1701/YES), the payload-stuck state determination unit 191B performs by the internal time counter A the counting of a time T which will lapse from the determination of the dumping state ST3 (S2902), and processing is performed from S1703.

When the processing of S1706 is performed, the count value of the internal time counter A is set at 0 to initialize (reset) the time counter A (S2903). When the processing of S1702 or S2903 is performed, the payload-stuck state determination unit 191B determines whether or not the time T counted by the time counter A has lapsed over the preset period of time T4 (S2904). If the time T is determined not to have lapsed over the preset period of time T4 at this time (S2904/NO), the payload-stuck state determination unit 191B performs processing from S1707. It is to be noted that the period of time T4 is set longer than the time T1.

If the time T is determined to have lapsed over the preset period of time T4 on the other hand in S2904 (S2904/YES), the determination of the state of loading in the vessel 6 cannot be performed. Accordingly, the payload-stuck state determination unit 191B sets the determination disable signal to ON state to stop the determination for a payload-stuck state (S2905), and processing is performed from S1707. When the processing of S1708 is performed, the determination disable signal is set to OFF state (S2906), and the determination processing for the payload-stuck state by the payload-stuck state determination unit 191B is ended.

The determination processing for a dumping-completed state by the dumping-completed state determination unit 192B in the fourth embodiment of the present invention will next be described in detail based on the flowchart of FIG. 30. It is to be noted that the determination processing for the dumping-completed state by the dumping-completed state determination unit 192B in the fourth embodiment of the present invention includes processing similar to the above-mentioned processing of S1801 to S1808 illustrated in FIG. 18, and overlapping description is omitted. It is also to be noted that the dumping-completed state determination unit 192B has two time counters internally mounted to count two different time ranges, and signs A and B are applied to these time counters, respectively, to distinguish them from each other.

Figure 30:
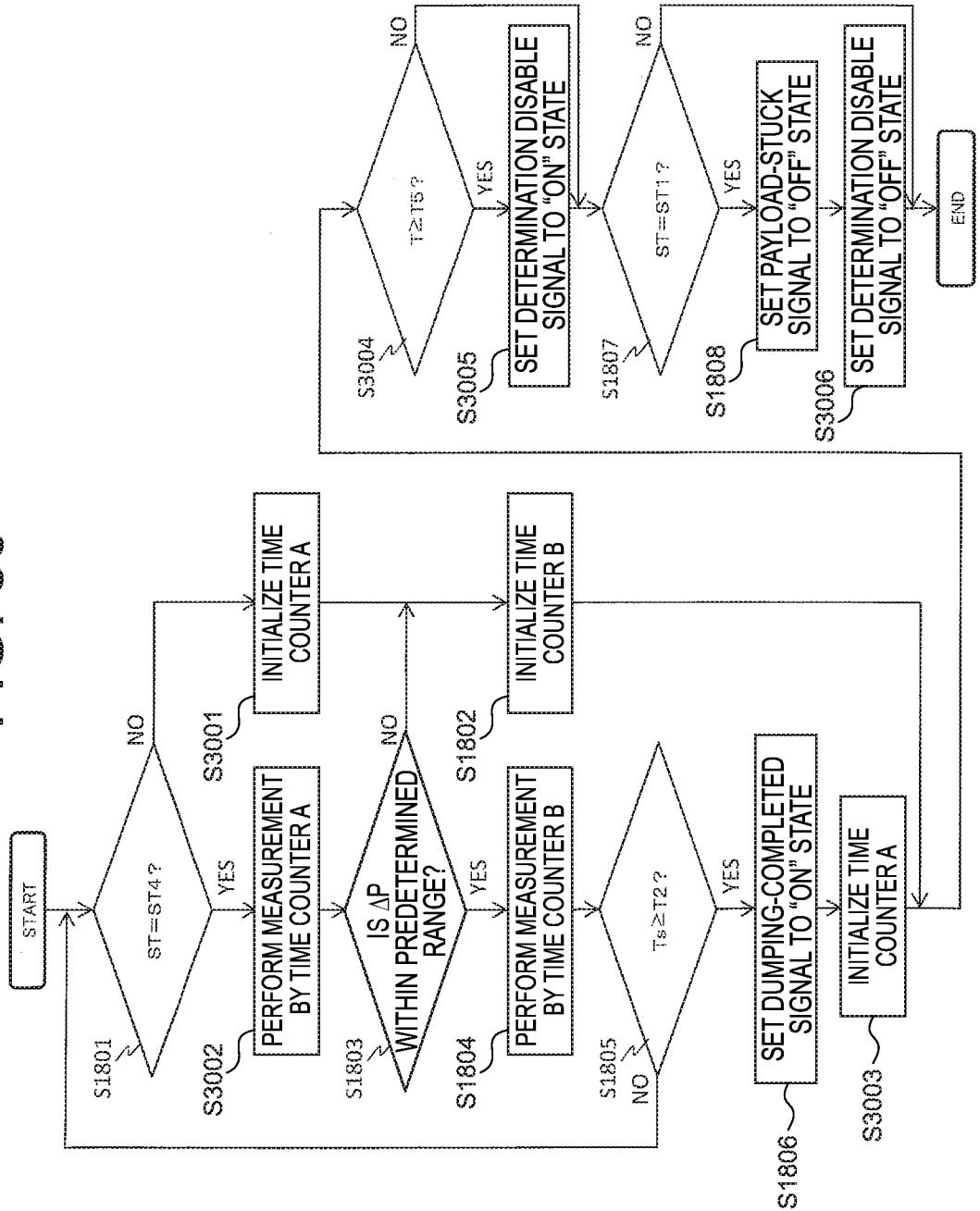
FIG. 30 is a flowchart illustrating a flow of determination processing for a dumping-completed state by a dumping-completed state determination unit in the fourth embodiment of the present invention.

As illustrated in FIG. 30, if the body frame state ST is determined not to be the vessel-raised forward moving state ST4 in S1801 (S1801/NO), the dumping-completed state determination unit 192B sets the count value of the internal time counter A at 0 to initialize (reset) the time counter A (S3001), and processing is performed from S1802. If the body frame state ST is determined to be the vessel-raised forward moving state ST4 in S1801 (S1801/YES), the dumping-completed state determination unit 192B performs by the internal time counter A the counting of a time T which will lapse from the determination of the vessel-raised forward moving state ST4 (S3002), and processing is performed from S1803.

When the processing of S1806 is performed, the count value of the internal time counter A is set at 0 to initialize (reset) the time counter A (S3003). When the processing of S1802 or S3003 is performed, the dumping-completed state determination unit 192B determines whether or not the time T counted by the time counter A has lapsed over the preset period of time T5 (S3004). If the time T is determined not to have elapsed over the predetermined time T5 at this time (S3004/NO), the dumping-completed state determination unit 192B performs processing from S1807. It is to be noted that the period of time T5 is set longer than the time T2.

If the time T is determined to have lapsed over the preset period of time T5 on the other hand in S3004 (S3004/YES), the determination of the state of loading in the vessel 6 cannot be performed. Accordingly, the dumping-completed state determination unit 192B sets the determination disable signal to ON state to stop the determination of a dumping-completed state (S3005), and processing is performed from S1807. When the processing of S1808 is performed, the determination disable signal is set to OFF state (S3006), and the determination processing for the dumping-completed state by the dumping-completed state determination unit 192B is ended.

The notification processing for the state of loading in the vessel 6 by the display unit 200A in the fourth embodiment of the present invention will next be described in detail based on the flowchart of FIG. 31. It is to be noted that the notification processing for the state of loading in the vessel 6 by the display unit 200A in the fourth embodiment of the present invention includes processing similar to the above-mentioned processing of S2001 to S2012 illustrated in FIG. 20, and overlapping description is omitted.

Figure 31:
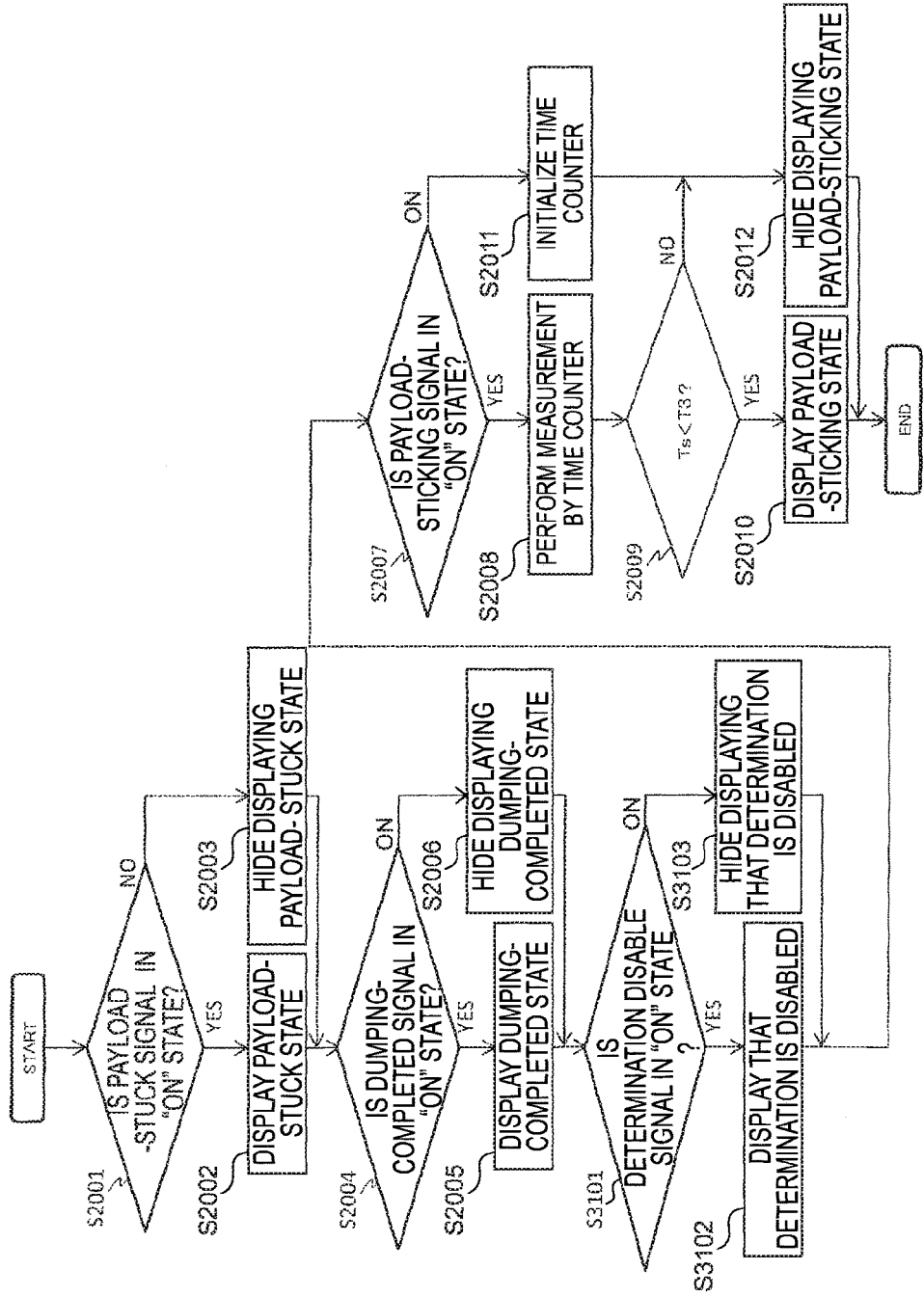
FIG. 31 is a flowchart illustrating a flow of notification processing for the state of loading in the vessel by a display unit in the fourth embodiment of the present invention.

As illustrated in FIG. 31, the display unit 200A confirms, after the performance of the processing of S2005 or S2006, whether or not the determination unable signal from the payload-stuck state determination unit 191B or dumping-completed state determination unit 192B is in ON state (S3101). If the determination unable signal is confirmed to be in ON state at this time (S3101/YES), the display unit 200A displays on a screen that the determination for the state of loading in the vessel 6 cannot be performed (S3102), and processing is performed from S2007.

If the determination unable signal is confirmed to be in OFF state in S3101 (S3101/NO), the display unit 200A hides from the screen the display that the determination of the state of loading in the vessel 6 cannot be performed (S3103), and processing is performed from S2007.

With the dumping work determination system 100C according to the fourth embodiment of the present invention configured as described above, it is still possible to obtain similar advantageous effects as the above-mentioned first embodiment. Even if, for example, one or more of the sensors 16, 17, 180 develops or develop trouble or the like and the determination of a payload-stuck state and a dumping-completed state by the payload-stuck state determination unit 191B and dumping-completed state determination unit 192B can no longer be performed, this situation will not be left unsolved. It is, therefore, possible to avoid delay in dumping work from the dump truck 1. As a consequence, the efficiency of dumping work can be enhanced further.

It is to be noted that the above-described embodiments are described in detail to facilitate the understanding of the present invention and therefore that the present invention shall not be necessarily limited to those provided with all the elements described above. Further, one or more of the elements of one of the embodiments may be replaced by the corresponding element or elements of another one of the embodiments, or one or more of the elements of one of the embodiments may be added to the configuration of another one of the embodiments.

The above embodiments are described about a situation that as illustrated in FIG. 2, the dumping site for the dump truck 1 or 1A is provided on a flat ground surface. Without being limited to such a situation, the dumping site for the dump truck 1 or 1A may be provided under a cliff as illustrated in FIG. 3. If the dump truck 1 or 1A is in a situation that its body frame has stopped nearer than the location of the cliff, a similar event arises as in the case that the earth 5 is dumped onto a flat ground surface. Accordingly, similar advantageous effects as those mentioned above can be obtained.

Figure 32:
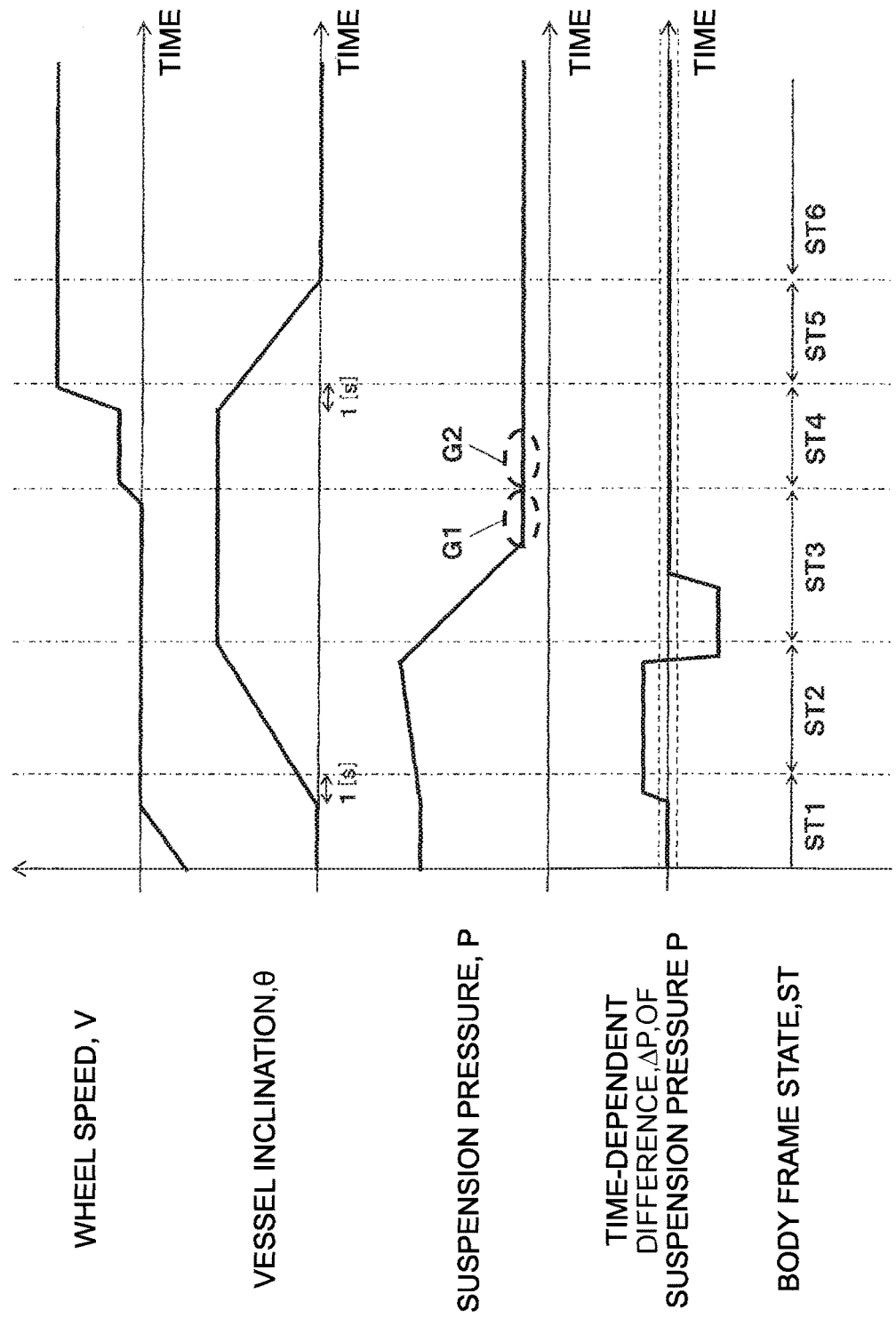
FIG. 32 is a graph showing examples of time series variations of wheel speed V, vessel inclination θ, suspension pressure P, time-dependent difference ΔP of suspension pressure P, and body frame state ST upon dumping earth, the stickiness of which is not high, is dumped from a vessel when a dumping site is provided under a cliff.

In a situation that the dump truck 1 or 1A has stopped with its body frame located sufficiently close to the side of a cliff, on the other hand, the earth 5 is not stuck in the vessel 6 during dumping work. As shown in FIG. 32, in states G1,G2 that arise when the body frame state ST is the dumping state ST3 and vessel-raised forward moving state ST4, respectively, the suspension pressure P takes the same value so that the body frame state can be considered to, be the dumping-completed state. In this case, the payload-stuck state determination unit 191 can determine, as the state of loading in the vessel 6, the dumping-completed state along with the determination of the payload-stuck state so that the dumping-completed state determination unit 192 can be omitted.

The invention claimed is:

1. A dumping work determination system for a haulage vehicle provided with a body frame, a vessel disposed above the body frame to load therein an object to be hauled, and a drive mechanism disposed on the body frame to permit selectively raising or lowering the vessel relative to the body frame such that upon dumping the object from the vessel, the vessel is lifted up and raised, said dumping work determination system being applicable to the haulage vehicle to determine a state of loading in the vessel in dumping work from the haulage vehicle, wherein:
    the dumping work determination system comprises:
    a body frame speed detector that detects a speed of the body frame,
    a tilted state detector that detects a tilted state of the vessel relative to the body frame,
    a shake detector that detects shakes of the vessel, which occur upon dumping the object from the vessel,
    a payload-stuck state determination unit that based on signals from the body frame speed detector, tilted state detector and shake detector, determines whether or not the state of loading in the vessel in the dumping work is a payload-stuck state indicative of a state that the object is stuck in the vessel, and
    an output unit that outputs a result of the determination by the payload-stuck state determination unit; and
    the payload-stuck state determination unit determines the state of loading in the vessel to be the payload-stuck state when the speed of the body frame is detected by the body frame speed detector to have reached lower than a predetermined speed, the vessel is detected by the tilted state detector to have tilted to a predetermined position, and a state where the vessel can be considered to have no longer produced shakes is detected by the shake detector.

2. The dumping work determination system according to claim 1, wherein:
    the dumping work determination system further comprises a dumping-completed state determination unit that based on signals from the body frame speed detector, tilted state detector and shake detector, determines whether or not the state of loading in the vessel in the dumping work is a dumping-completed state indicative of a state that dumping of the object from the vessel has been completed;
    the dumping-completed state determination unit determines the state of loading in the vessel to be the dumping-completed state when the speed of the body frame is detected by the body frame speed detector to have increased to the predetermined speed or higher, the vessel is detected by the tilted state detector to have tilted to the predetermined position, and a state where the vessel can be considered to have no longer produced shakes is detected by the shake detector; and
    the output unit outputs a result of the determination by the dumping-completed state determination unit.

3. The dumping work determination system according to claim 2, wherein:
    the haulage vehicle is further provided with:
    rear wheels rotatably disposed on a rear section of the body frame, and
    rear suspension cylinders interposed between the body frame and the rear wheels, respectively, to support the vessel via the body frame;
    the shake detector comprises a pressure detector that detects a pressure in one of the rear suspension cylinders;
    the payload-stuck state determination unit determines the state of loading in the vessel to be the payload-stuck state when the speed of the body frame is detected by the body frame speed detector to have reached lower than the predetermined speed, the vessel is detected by the tilted state detector to have tilted to the predetermined position, and a time-dependent difference of the pressure in the one rear suspension cylinder as obtained from a detection value of the pressure detector remains within a predetermined range during a predetermined period of time; and
    the dumping-completed state determination unit determines the state of loading in the vessel to be the dumping-completed state when the speed of the body frame is detected by the body frame speed detector to have increased to the predetermined speed or higher, the vessel is detected by the tilted state detector to have tilted to the predetermined position, and the time-dependent difference of the pressure in the one rear suspension cylinder as obtained from the detection value of the pressure detector remains within the predetermined range during the predetermined period of time.

4. The dumping work determination system according to claim 2, wherein:
the shake detector comprises an acceleration detector that detects an acceleration of the vessel;
the payload-stuck state determination unit determines the state of loading in the vessel to be the payload-stuck state when the speed of the body frame is detected by the body frame speed detector to have reached lower than the predetermined speed, the vessel is detected by the tilted state detector to have tilted to the predetermined position, and the acceleration of the vessel as obtained from a detection value of the acceleration detector remains within a predetermined range during a predetermined period of time; and
the dumping-completed state determination unit determines the state of loading in the vessel to be the dumping-completed state when the speed of the body frame is detected by the body frame speed detector to have increased to the predetermined speed or higher, the vessel is detected by the tilted state detector to have tilted to the predetermined position, and the acceleration of the vessel as obtained from the detection value of the acceleration detector remains within the predetermined range during the predetermined period of time.

5. The dumping work determination system according to claim 3, wherein:
the dumping work determination system further comprises:
a body frame state determination unit that determines the state of the body frame in the dumping work to be a raised-vessel maintaining state indicative of a state, in which the vessel remains lifted up and raised, when the speed of the body frame is detected by the body frame speed detector to have reached lower than the predetermined speed and the vessel is detected by the tilted state detector to have tilted to the predetermined position, or determines the state of the body frame to be a vessel-raised forward moving state indicative of a state, in which the haulage vehicle has moved forward with the vessel lifted up, when the speed of the body frame is detected by the body frame speed detector to have increased to the predetermined speed or higher and the vessel is detected by the tilted state detector to have tilted to the predetermined position, and
a payload-sticking state determination unit that based on signals from the body frame state determination unit, payload-stuck state determination unit and pressure detector, determines whether or not the state of loading in the vessel in the dumping work is a payload-sticking state indicative of a state that the object is sticking on the vessel;
the payload-sticking state determination unit determines the state of loading in the vessel to be the payload-sticking state when the state of the body frame determined by the body frame state determination unit to be the raised-vessel maintaining state, the state of loading in the vessel is determined by the payload-stuck state determination unit not to be the payload-stuck state, and a time difference of the pressure in the one rear suspension cylinder as obtained from a detection value of the pressure detector varies beyond a preset positive threshold level or negative threshold level;

the output unit outputs a result of the determination by the payload-sticking state determination unit.

6. The dumping work determination system according to claim 4, wherein:
the dumping work determination system further comprises:
a body frame state determination unit that determines the state of the body frame in the dumping work to be a raised-vessel maintaining state indicative of a state, in which the vessel remains lifted up and raised, when the speed of the body frame is detected by the body frame speed detector to have reached lower than the predetermined speed and the vessel is detected by the tilted state detector to have tilted to the predetermined position, or determines the state of the body frame to be a vessel-raised forward moving state indicative of a state, in which the haulage vehicle has moved forward with the vessel lifted up, when the speed of the body frame is detected by the body frame speed detector to have increased to the predetermined speed or higher and the vessel is detected by the tilted state detector to have tilted to the predetermined position, and
a payload-sticking state determination unit that based on signals from the body frame state determination unit, payload-stuck state determination unit and acceleration detector, determines whether or not the state of loading in the vessel in the dumping work is a payload-sticking state indicative of a state in which the object is sticking on the vessel;
the payload-sticking state determination unit determines the state of loading in the vessel to be the payload-sticking state when the state of the body frame is determined by the body frame state determination unit to be the raised-vessel maintaining state, the state of loading in the vessel is determined by the payload-stuck state determination unit not to be the payload-stuck state, and a difference in the acceleration of the vessel as detected by the acceleration detector becomes greater than a predetermined difference;
the output unit outputs a result of the determination by the payload-sticking state determination unit.

7. The dumping work determination system according to claim 5, wherein:
the output unit comprises a notification unit that is disposed on the haulage vehicle and, according to results of the determinations by the payload-stuck state determination unit, dumping-completed state determination unit and payload-sticking state determination unit, notifies the state of loading in the vessel.

8. The dumping work determination system according to claim 6, wherein:
the output unit comprises a notification unit that is disposed on the haulage vehicle and, according to results of the determinations by the payload-stuck state determination unit, dumping-completed state determination unit and payload-sticking state determination unit, notifies the state of loading in the vessel.

9. The dumping work determination system according to claim 2, wherein:
the output unit comprises a body frame control unit that performs control to allow the haulage vehicle to move forward when the state of loading in the vessel is determined by the payload-stuck state determination unit to be the payload-stuck state or performs control to lift down and lower the vessel by actuating the drive mechanism when the state of loading in the vessel is determined by the dumping-completed state determination unit to be the dumping-completed state.

10. The dumping work determination system according to claim 5, wherein:
the output unit comprises a shaking control unit that performs control to shake the vessel when the state of loading in the vessel is determined by the payload-sticking state determination unit to be the payload-sticking state.

11. The dumping work determination system according to claim 6, wherein:
the output unit comprises a shaking control unit that performs control to shake the vessel when the state of loading in the vessel is determined by the payload-sticking state determination unit to be the payload-sticking state.

* * * * *